(12) United States Patent
Maynard et al.

(10) Patent No.: US 12,318,856 B2
(45) Date of Patent: Jun. 3, 2025

(54) TELESCOPING TORCH

(71) Applicant: The ESAB Group Inc., Annapolis Junction, MD (US)

(72) Inventors: Auston Maynard, East Thetford, VT (US); Michael Nadler, Wilmot, NH (US); Douglas Smith, Florence, SC (US)

(73) Assignee: THE ESAB GROUP INC., North Bethesda, MD (US)

( * ) Notice: Subject to any disclaimer, the term of this patent is extended or adjusted under 35 U.S.C. 154(b) by 106 days.

(21) Appl. No.: 17/665,697

(22) Filed: Feb. 7, 2022

(65) Prior Publication Data

US 2022/0250184 A1   Aug. 11, 2022

Related U.S. Application Data

(60) Provisional application No. 63/147,874, filed on Feb. 10, 2021.

(51) Int. Cl.
*B23K 10/00* (2006.01)
*H05H 1/34* (2006.01)

(52) U.S. Cl.
CPC ............... *B23K 10/00* (2013.01); *H05H 1/34* (2013.01)

(58) Field of Classification Search
CPC . B23K 10/00; B23K 9/26; B23K 9/24; B23K 9/28; B23K 9/282; B23K 9/285; B23K 9/287; B23K 9/29; B23K 9/291; B23K 9/296; B23K 9/32; B23K 9/323; B23K 9/321; B23K 9/322; B23K 10/02; B23K 35/02; B23K 35/00; B23K 35/0205; B23K 35/0211; B23K 35/0216; B23K 35/0255; B23K 35/0261; B23K 35/0277; B23K 35/0266; H05H 1/34; H05H 1/26; H05H 1/3447; H05H 1/3423; H05H 1/3421; H05H 1/341; H05H 1/3405; H05H 1/3431; H05H 1/3442; H05H 1/3457; H05H 2245/60
(Continued)

(56) References Cited

U.S. PATENT DOCUMENTS 4,018,973 A   4/1977  Paton et al.
4,118,620 A   10/1978 Wall, Jr. et al.
(Continued)

FOREIGN PATENT DOCUMENTS

CN   205129131 U   4/2016
CN   103737163 B   6/2016
(Continued)

OTHER PUBLICATIONS

English translation to JPH10180450 (Year: 1998).*
(Continued)

*Primary Examiner* — Sang Y Paik
*Assistant Examiner* — Bonita Khlok
(74) *Attorney, Agent, or Firm* — Edell, Shapiro & Finnan, LLC

(57) ABSTRACT

A torch having an adjustable length. The torch may include a first housing portion and a second housing portion. The second housing portion may be slidably coupled to the first housing portion. The second housing portion may be configured to slide along a longitudinal direction of the torch to adjust a length of the torch.

19 Claims, 20 Drawing Sheets

(58) Field of Classification Search
USPC ............. 219/121.36, 121.39, 121.48–121.52
See application file for complete search history.

(56) References Cited

U.S. PATENT DOCUMENTS

| | | | | |
|---|---|---|---|---|
| 4,791,266 A | * | 12/1988 | Gerard | ................... B23K 9/323 |
| | | | | 219/121.48 |
| 5,558,268 A | | 9/1996 | Acheson | |
| 6,010,329 A | | 1/2000 | Zagoroff | |
| 6,172,334 B1 | * | 1/2001 | Harris | ...................... B23K 9/32 |
| | | | | 219/127 |
| 6,227,846 B1 | | 5/2001 | Zagoroff | |
| 6,284,995 B1 | | 9/2001 | Esslinger et al. | |
| 6,512,194 B1 | | 1/2003 | Koshurba et al. | |
| 8,373,094 B2 | | 2/2013 | Wells et al. | |
| 8,963,046 B2 | | 2/2015 | Wells et al. | |
| 9,770,832 B2 | | 9/2017 | Cosette et al. | |
| 2014/0138360 A1 | | 5/2014 | Hansen et al. | |
| 2015/0076120 A1 | | 3/2015 | Pagano et al. | |
| 2016/0279807 A1 | * | 9/2016 | Cossette | ................. B23K 9/00 |
| 2017/0182582 A1 | | 6/2017 | Daniels et al. | |
| 2017/0342338 A1 | | 11/2017 | McKenna et al. | |
| 2018/0116043 A1 | | 4/2018 | Roberts et al. | |
| 2021/0144837 A1 | * | 5/2021 | Namburu | ............. B23K 10/006 |
| 2021/0146468 A1 | * | 5/2021 | Jogdand | ............... H05H 1/3489 |
| 2021/0219412 A1 | * | 7/2021 | Chevalier | ................ H05H 1/28 |

FOREIGN PATENT DOCUMENTS

| | | | |
|---|---|---|---|
| CN | 106964868 A | | 7/2017 |
| EP | 3334257 A1 | | 6/2018 |
| JP | 10180450 A | | 7/1998 |
| JP | H10180450 | * | 7/1998 |
| JP | 3591182 B2 | | 11/2004 |
| WO | 2009021024 A2 | | 2/2009 |

OTHER PUBLICATIONS

Notification of Transmittal of International Search Report and Written Opinion including International Search Report and Written Opinion for International Application No. PCT/US2022/015406 dated May 6, 2022, 16 pages.

* cited by examiner

TELESCOPING TORCH

CROSS-REFERENCE TO RELATED APPLICATIONS

This application claims priority under 35 U.S.C. 119(e) to U.S. Provisional Patent Application Ser. No. 63/147,874, entitled "TELESCOPING TORCH", filed Feb. 10, 2021, the disclosure of which is incorporated herein by reference in its entirety for all purposes.

TECHNICAL FIELD

The present disclosure is directed toward welding and/or cutting torches and, in particular, to length adjustable welding and/or cutting torches.

BACKGROUND OF THE INVENTION

Current welding and plasma torches have a set length, and that length is typically not adjustable. Every torch length offers specific trade-offs to the user of the torch as there are advantages to both longer torches and shorter torches. For example, a longer torch may provide at least the following advantages: better visibility of the torch tip; better manual control due to the responsiveness of the torch resulting from a longer moment arm from the user's hands; improved reach; improved safety (i.e., by keeping a user's hands further from the heat and slag), etc. A shorter torch may provide at least the following advantages: better maneuverability in tight spaces/corners; improved portability; improved durability; is easier to keep steady, etc. However, users may require different torches of different lengths depending on a specific task that must be completed. This may result in a user having to switch torches in the middle of a single job as the performance needs and desires of the torch change. Because torches of different lengths may be required for a particular job or a particular task, the need to transport multiple torches of varying lengths results in added cost and space requirements.

Thus, torches with an adjustable length are desired since a user can continue cutting or welding operations without changing out the torch for a specific task. Additionally, torches having an adjustable length may provide both costs and space requirement savings for users since multiple torches will not be required to complete a job. Torches having an adjustable length may also be desirable for the ergonomics (i.e., each user may prefer a torch of different lengths regardless of the specific job or task that needs to be completed) they provide.

SUMMARY OF THE INVENTION

The present disclosure is directed towards welding/cutting torches that are configured to telescope between at least an expanded configuration and a condensed or collapsed configuration. Thus, the length of the torch may be adjusted to a desired length for a specific use or application. In some embodiments, the length of the torch may be capable of being set to any number of positions (i.e., lengths) between a fully expanded configuration, where the torch is at its longest length, and a fully collapsed configuration, where the torch is at its shorted length.

According to one embodiment, a plasma arc torch presented herein includes a first torch housing portion and a second torch housing portion. The second torch housing portion may be slidably coupled to the first torch housing portion. The second torch housing portion may be configured to slide along a longitudinal direction of the plasma arc torch to adjust a length of the plasma arc torch.

In at least some instances, the second torch housing portion may include a torch head segment and a neck segment. Additionally, the neck segment may include an exterior surface. Still further, in some instances, the exterior surface of the neck segment may include a series of notches that may be longitudinally spaced from one another along the neck segment. In at least some further instances, the first torch housing portion may include a length adjustment mechanism that may be configured to operatively engage one of the series of notches of the neck segment to secure the second torch housing portion with respect to the first torch housing portion.

Moreover, in some instances, the exterior surface of the neck segment of the second torch housing portion may include a tab. The first torch housing portion may include a conduit configured to slidably receive the neck segment of the second torch housing portion. In addition, the first torch housing portion may further include a longitudinal slot disposed in an interior sidewall of the conduit, where the longitudinal slot may be configured to receive the tab of the neck segment of the second torch housing portion.

In some further instances, an end of the first torch housing portion may include a series of annular tabs. Moreover, a lock ring may be threaded onto the series of annular tabs. The lock ring may be configured to cause the series of annular tabs to impart a clamping force onto the exterior surface of the neck segment, where the amount of the clamping force may be based on rotation of the lock ring with respect to the series of annular tabs.

According to another embodiment, a plasma arc torch is presented herein that may include a torch body, a torch head housing, and an electrical connection. The torch body may define a first end and a second end opposite the first end. The torch body may further define an interior cavity. The torch head housing may be slidably coupled to the first end of the torch body, where the torch head housing may be configured to slide along a longitudinal direction of the plasma arc torch to adjust a length of the plasma arc torch. The electrical connection may include a first tube and a second tube. The first tube may be fixed to the torch head housing, and the second tube may be disposed within the interior cavity of the torch body. The first tube and the second tube may be nested within one another.

In some instances, the second tube may include a first end and a second end opposite the first end, the first end of the second tube being disposed within an interior of the first tube. The second tube may additionally include a gasket disposed over an exterior surface of the second tube proximate to the first end of the second tube. Furthermore, the second tube may also include a conductive contact disposed over an exterior surface of the second tube proximate to the first end of the second tube. In some instances, the conductive contact may be a component that is integrally built into the second tube (i.e., the conductive contact and the second tube may be formed together as one structure rather than the conductive contact being a separate element attached to the second tube). In at least some further instances, the second end of the second tube may be coupled to a gas supply line and/or main cutting current.

Moreover, in some instances, the torch body may further include a conduit disposed in the first end of the torch body, and in communication with the interior cavity of the torch body. In even some further instances, the torch head housing may further include a torch head portion and a neck portion, the neck portion being at least partially received by the conduit of the torch body.

According to yet another embodiment, a plasma arc torch is presented herein and may include a torch body, a torch head housing, and an electrical connection. The torch body may define a first end and a second end opposite the first end. The torch body may further define an interior cavity. The torch head housing may be slidably coupled to the first end of the torch body, the torch head housing being configured to slide along a longitudinal direction of the plasma arc torch to adjust the length of the plasma arc torch. The electrical connection may include a first electrical contact and a second electrical contact. The first electrical contact may be disposed within the interior cavity of the torch body. The second electrical contact may extend from the torch head housing and may be in contact with the first electrical contact. The second electrical contact may slide along the first electrical contact when the torch head housing slides along the longitudinal direction with respect to the torch body.

In some instances, the torch body may further include a conduit disposed in the first end of the torch body and in communication with the interior cavity of the torch body. Additionally, the torch head housing may include a torch head portion and a neck portion. The neck portion may include a distal end coupled to the torch head portion and a proximal end opposite the distal end. The neck portion may be at least partially received by the conduit of the torch body such that the proximal end is disposed within the conduit. Moreover, in some instances, the first electrical contact may include a conductive portion that spans along at least a length of the conduit within the interior cavity of the torch body. In even some further instances, the second electrical contact may extend from the neck portion of the torch head housing proximate to the proximal end of the neck portion.

In other instances, the torch head housing may be configured to slide along the longitudinal direction of the plasma arc torch between at least an expanded position and a collapsed position. In the expanded position, the plasma arc torch may have an expanded length. In the collapsed position, the plasma arc torch may have a collapsed length. The expanded length may be greater than the collapsed length. In some further instances, the electrical connection may be a continuous flexible wire that may be at least partially disposed in both the torch head housing and the torch body. The continuous flexible wire may have a wire length that is at least equal to the expanded length of the plasma arc torch such that, when the torch head housing is in the collapsed position, a segment of the continuous flexible wire may be bunched within the interior cavity of the torch body.

Other systems, methods, features and advantages will be, or will become, apparent to one with skill in the art upon examination of the following figures and detailed description. All such additional systems, methods, features and advantages are included within this description, are within the scope of the claimed subject matter.

BRIEF DESCRIPTION OF THE DRAWINGS

The torches presented herein may be better understood with reference to the following drawings and description. It should be understood that the elements in the figures are not necessarily to scale and that emphasis has been placed upon illustrating the principles of the torches. In the figures, like-referenced numerals designate corresponding parts throughout the different views.

DETAILED DESCRIPTION OF THE INVENTION

Figure 1A:
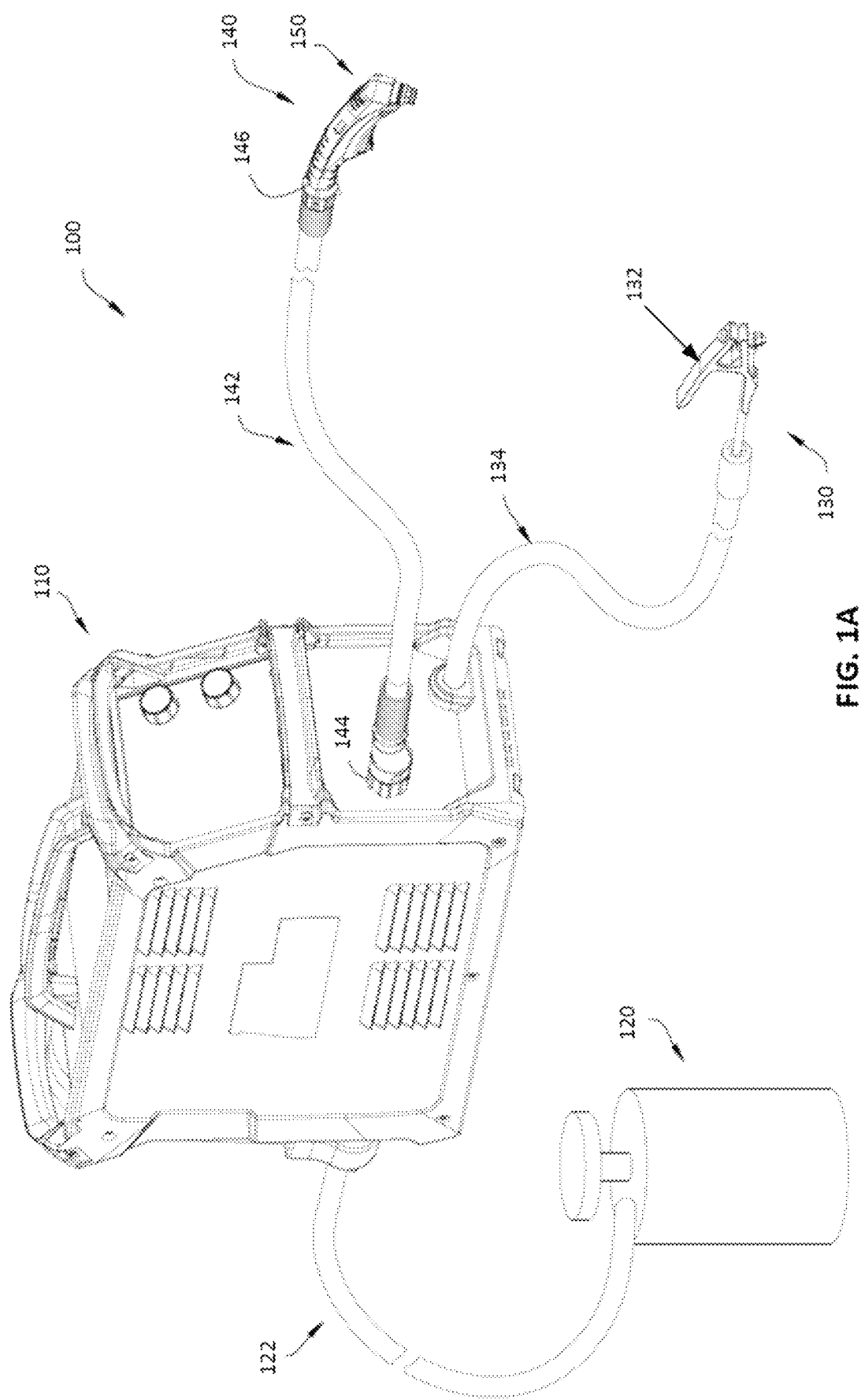
FIG. 1A is a perspective view of a manual cutting system including a power source and torch assembly with which the torches presented herein may be utilized, according to an example embodiment of the present disclosure.

The present invention is directed to a plasma arc torch that has an adjustable length via a first torch portion that telescopes with respect to a second torch portion. The first torch portion, or torch head portion, may include a torch head segment and a neck segment. The torch head segment may be configured to receive and retain a consumable assembly, while the neck segment may be an elongated structure having a first end coupled to the torch head segment and an opposite second end. In some embodiments, the neck segment may have a series of notches or slots disposed longitudinally along the exterior surface of the neck segment. At least a portion of the neck segment, including the second end of the neck segment, may be slidably received within an interior cavity of the second torch portion, or torch housing portion, such the second end of the neck segment of the first torch portion slides through the interior cavity of the second torch portion. The first torch portion may be telescoped with respect to the second torch portion between a collapsed position, where the torch head segment of the first torch portion is disposed proximate to the second torch portion, and an extended position, where the torch head segment of the first torch portion is spaced from the second torch portion.

In some embodiments, the second torch portion may be equipped with a length adjustment mechanism that engages the neck segment of the first torch portion. For example, in some embodiments, the second torch portion may be equipped with a spring loaded pin or screw that engages the notches of the neck segment of the first torch portion. In other examples, the plasma arc torch may be equipped with a collet style connection disposed on the second torch portion that receives the first torch portion, and specifically the neck segment of the first torch portion. The collet may then be tightened over the neck segment of the first torch portion to secure the first torch portion in a position with respect to the second torch portion. In some embodiments, one of the first and second torch portions may be equipped with a tab, while the other portion may be equipped with a slot in which the tab may be nested in order to prevent the first torch portion from rotating with respect to the second torch portion and limit linear range of motion.

In some embodiments, electrical and air connections between the torch portions may be formed within the torch via nesting conductive conduits. For example, the neck segment of the first torch portion may include a first conductive conduit, while the second torch portion may include a second conductive conduit. The first and second conductive conduits may be nested within one another to maintain an electrical connection while also permitting the passage of gas or air through the nested conductive conduits. In other embodiments, the electrical connection of the telescoping torch may be accomplished by an electrical wire disposed within the interior cavity, where the electrical wire has an excess length that allows a portion to be doubled over or bunched within the interior cavity of the second torch portion when the torch is in the collapsed position. In even further embodiments, the electrical connection of the telescoping torch may be accomplished with a first electrical contact that has a conductive portion running along a length of the interior cavity of the second torch portion, and a second electrical contact that is coupled to the first torch portion and that is in abutment with the conductive portion. The second electrical contact may slide along the conductive portion as the first torch portion telescopes with respect to the second torch portion. In yet even further embodiments, the torch lead or cable hose may be directly coupled to the first end of the neck segment of the first torch portion such that, when the second torch portion telescopes or slides out of the first torch portion to an expanded position, the second torch portion slides along the torch lead (i.e., shortening the exposed portion of the torch lead when the torch elongates).

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

FIG. 1A illustrates an example embodiment of a manual cutting system 100 that may utilize the plasma arc torch embodiments presented herein. At a high-level, the manual cutting system 100 may include a power supply 110 and a torch assembly 140. The power supply 110 may be configured to supply (or at least control the supply of) power and gas to a torch 150 included in the torch assembly 140 via torch lead 142 (also referred to as cable hose 142). For example, the power supply 110 may meter a flow of gas received from a gas supply 120, which the power supply 110 receives via cable hose 122, before or as the power supply 110 supplies gas to the torch 150 via cable hose 142.

The manual cutting system 100 may also include a working lead assembly 130 with a grounding clamp 132 that is connected to the power supply by a work lead 134 (also referred to as cable hose 134). As illustrated, cable hose 122, cable hose 134, and cable hose 142 may each be any length. Moreover, each end of cable hose 122, cable hose 134, and cable hose 142 may be connected to components of the manual cutting system 100 via any connectors now known or developed hereafter (e.g., via releasable connectors). For example, torch 150 may be connected to a distal end of cable hose 142 via a quick disconnect connector 146 and power supply 110 may be connected to a proximal end of cable hose 142 via a quick disconnect connector 144.

Figure 1B:
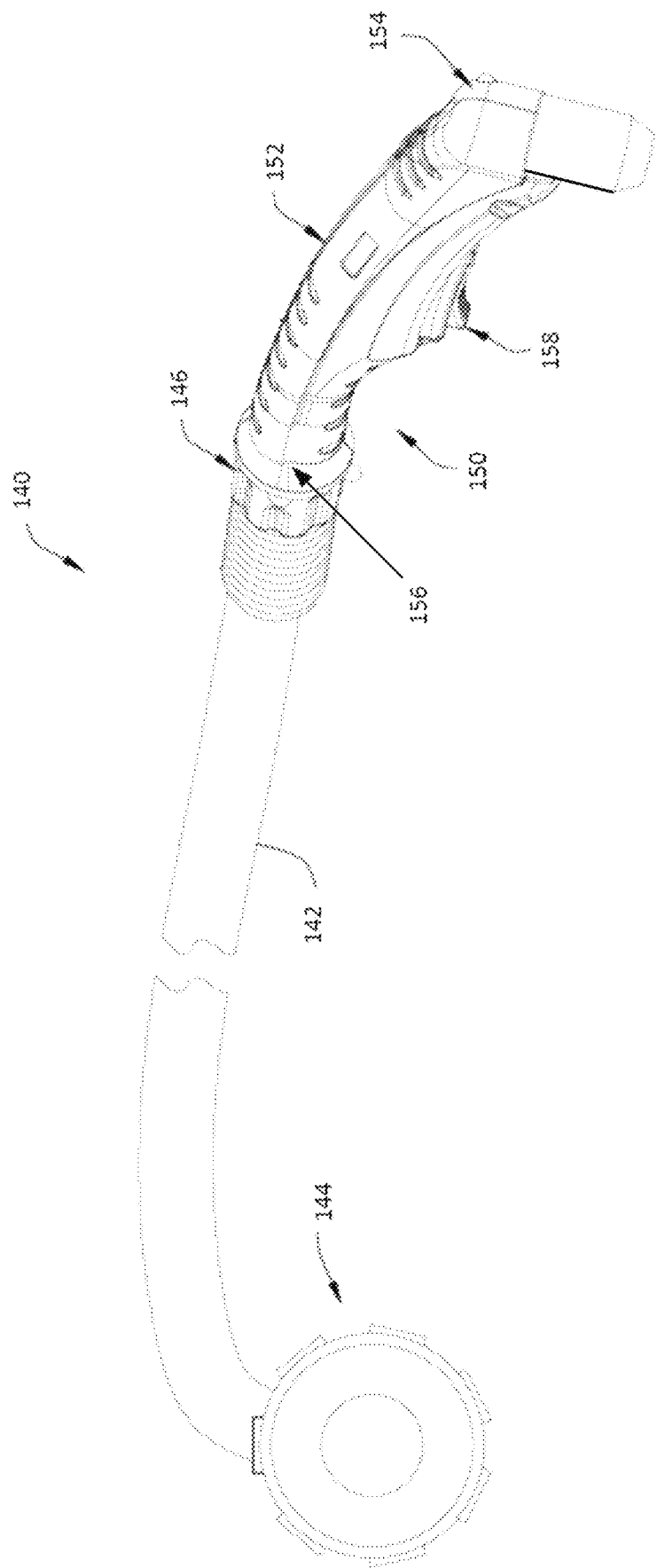
FIG. 1B is a perspective of the torch assembly of FIG. 1A.
Figure 2A:
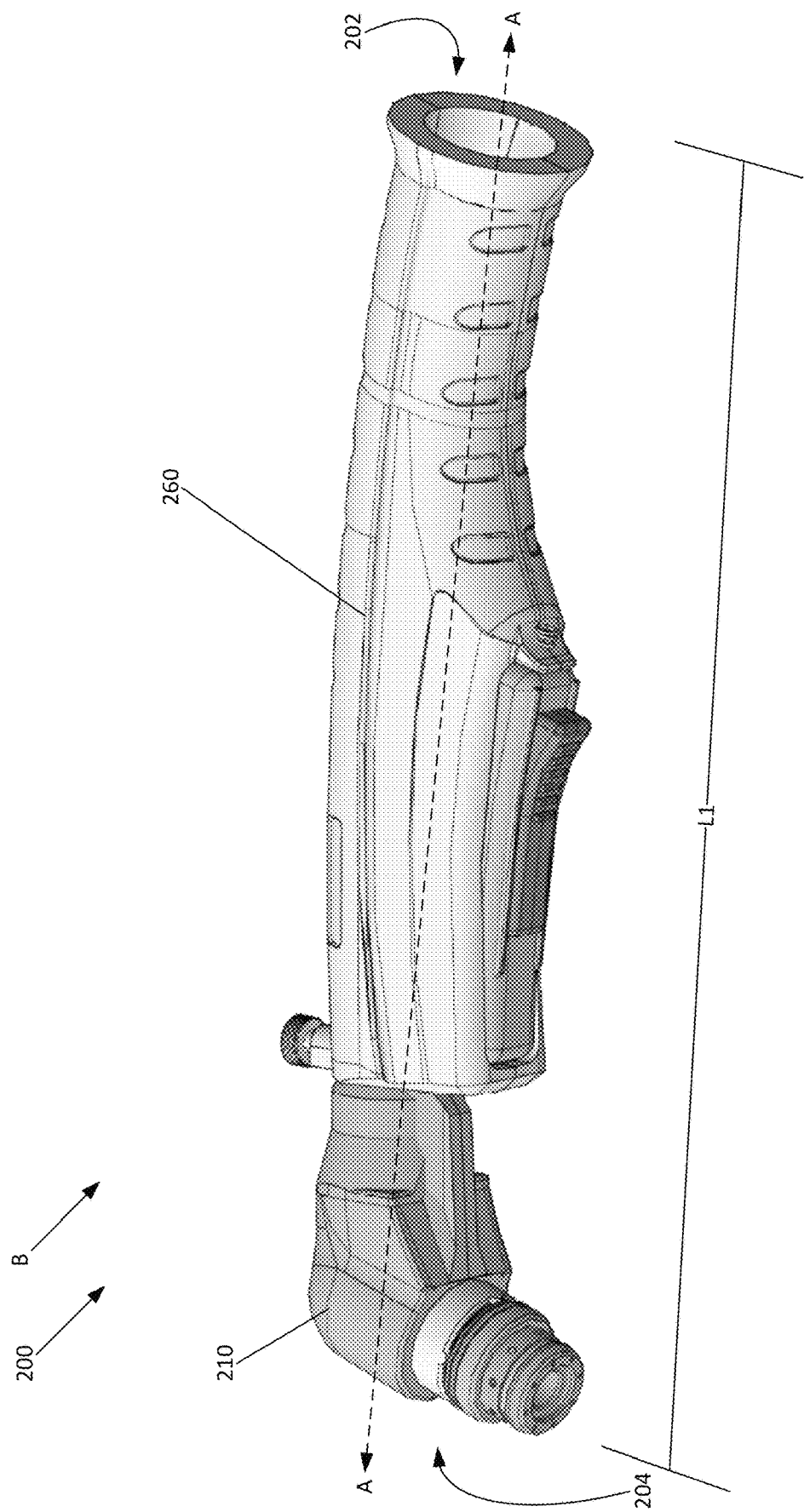
FIG. 2A is a perspective view of a first example embodiment of a torch according to the present disclosure, where the torch is in the fully collapsed configuration.
Figure 2B:
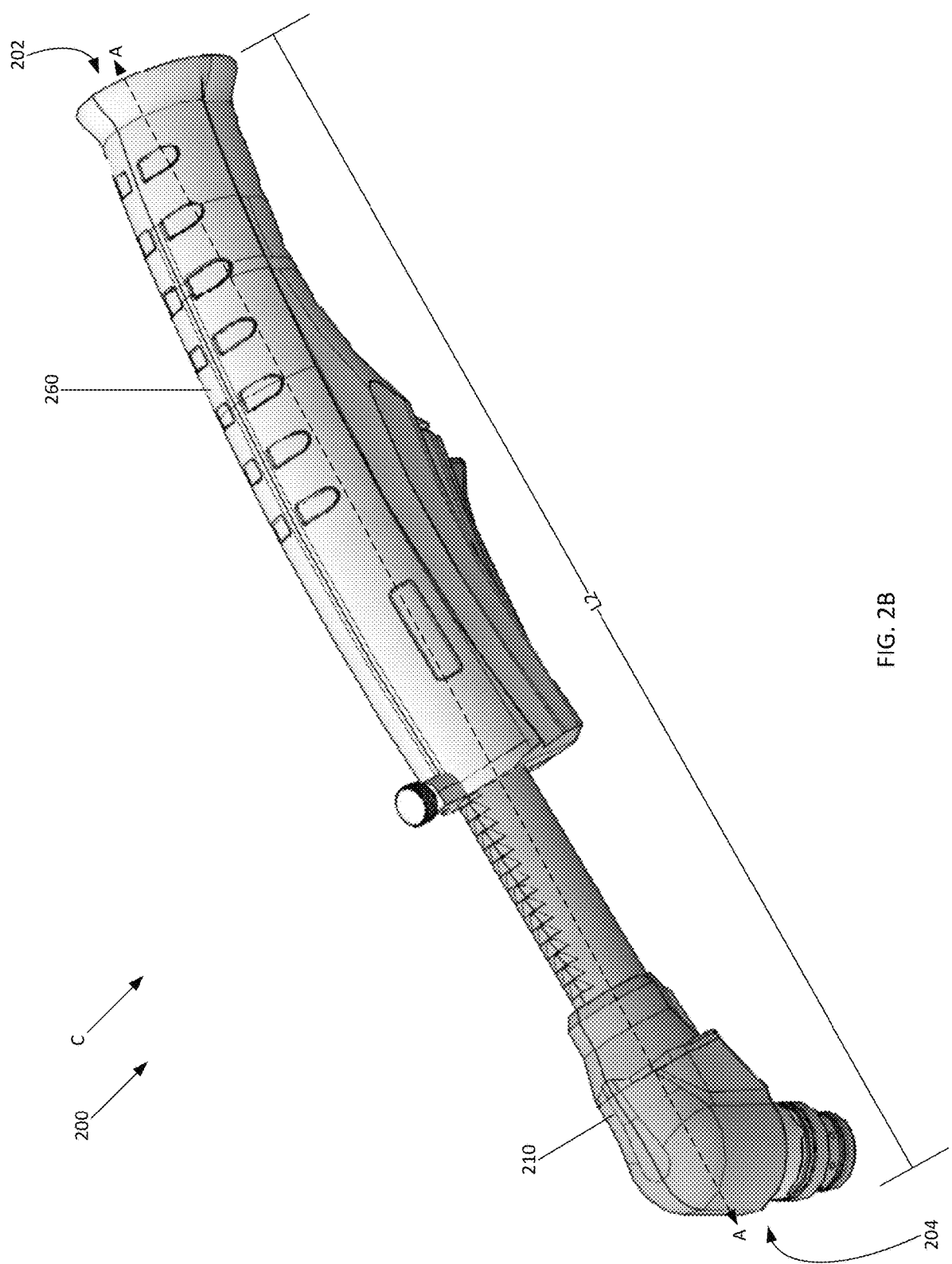
FIG. 2B is a perspective view of the first example embodiment of the torch illustrated in FIG. 2A, where the torch is in the fully expanded configuration.

FIG. 1B illustrates the torch assembly 140 of FIG. 1A independently from the power supply 110. As can be seen, the torch 150 includes a torch body 152 that extends from a first end 156 (e.g., a connection end 156) to a second end 154 (e.g., an operating or operative end 154). The torch body 152 may also include a trigger 158 that allows a user to initiate cutting operations in any manner now known or developed hereafter (e.g., in a 2T or 4T mode). As mentioned above, the connection end 156 of the torch body 152 may be coupled (in any manner now known or developed hereafter) to one end of lead 142 Meanwhile, the operative end 154 of the torch body 152 may receive interchangeable components, such as consumable components that facilitate cutting operations.

Turning to FIGS. 2A, 2B, 3, 4A, 4B, 5A, and 5B, illustrated is a first embodiment of a telescoping torch 200. The torch 200 may include a first end 202 (e.g., the connection end) and an opposite second end 204 (e.g., the operating end). The torch 200 may include a torch head housing 210 and a torch body housing 260. The torch head housing 210 may be disposed more proximate to the second end 204 of the torch 200 than the first end 202 of the torch 200. Furthermore, the torch body housing 260 may be disposed more proximate to the first end 202 of the torch 200 than the second end 204 of the torch 200. As explained in further detail below, the torch head housing 210 may be configured to telescope or slide along longitudinal axis A of the torch 200 between at least a collapsed position B (FIG. 2A), where the torch head housing 210 may be fully telescoped into the torch body housing 260 and the torch may have a length L1, and an expanded position C (FIG. 2B), where the torch head housing 210 may be fully telescoped out of the torch body housing 260 and the torch may have a length L2. The length L2 may be longer than the length L1. In some embodiments, the torch head housing 210 may be telescoped out of the torch body housing 260 to any number of positions between the collapsed position B and the expanded position C, where the length of the torch 200 in any of those positions is greater than the length L1 but less than the length L2.

Figure 3:
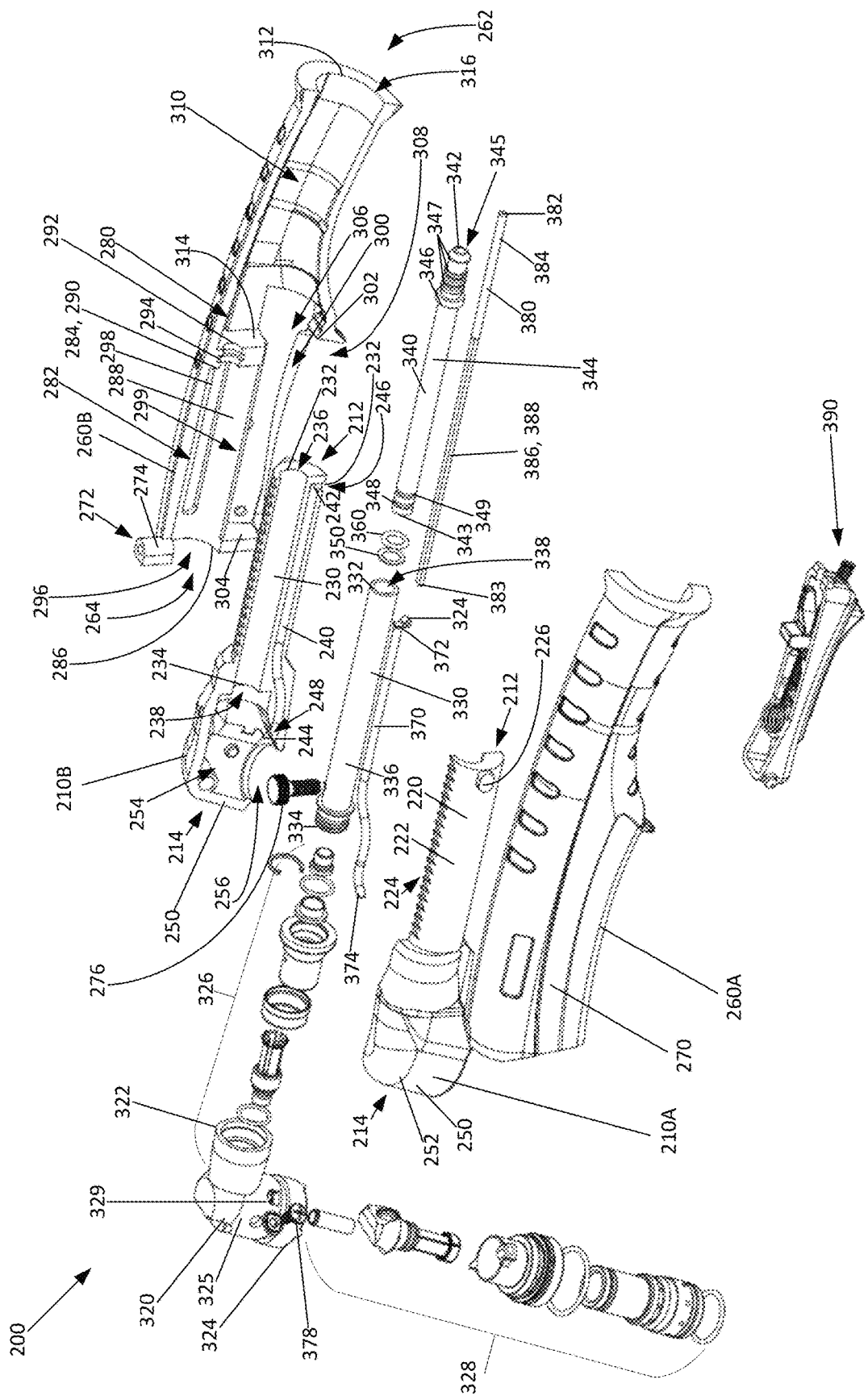
FIG. 3 is an exploded view of the first embodiment of the torch illustrated in FIG. 2A.

Turning to FIG. 3, which is an exploded view of the torch 200, as previously explained, the first embodiment of the torch 200 may include a torch head housing 210 and a torch body housing 260. FIG. 3 illustrates the torch head housing 210 split into two halves 210A, 210B for illustrative purposes only. As illustrated, the two halves 210A, 210B may be mirror images of one another. The torch head housing 210 may include a first end 212 (e.g., the connection end) and an opposite second end 214 (e.g., the operating end). The torch head housing may further include a neck portion 220 (sometimes referred to herein as neck segment), and a torch head portion 250 (sometimes referred to herein as torch head segment). In some embodiments, the neck portion 220 may be substantially cylindrical, while in other embodiments the neck portion 220 may be of any other elongated and/or prismatic shape. The neck portion 220 may be disposed more proximate to the first end 212 than the torch head portion 250. As further illustrated in FIGS. 2B and 3, the exterior surface 222 of the neck portion 220 may include a series of notches 224 that span longitudinally along the length of the neck portion 220. The notches 224 may be spaced equidistant from one another along the length of the neck portion 220. The exterior surface 222 of the neck portion may further include at least one tab 226 extending outward radially from the exterior surface 222 proximate to the first end 212 of the torch head housing 210. In the illustrated embodiment, the neck portion 220 includes a pair of tabs 226 disposed on opposing sides of the neck portion 220, while in other embodiments, the neck portion 220 may include any number of tabs 226 or no tabs 226.

As best illustrated in FIG. 3, the neck portion 220 may further include a first interior channel 230 and a second interior channel 240. The first interior channel 230 may include a first end 232 and an opposite second end 234, where the first end 232 includes a first opening 236 in the first end 212 of the torch head housing 210. The second end 234 of the first interior channel 230 may also include a second opening 238 disposed proximate to the torch head portion 250. Similarly, the second interior channel 240 may include a first end 242 and an opposite second end 244. The first end 242 of the second interior channel 240 may include a first or lower opening 246 disposed in the exterior surface 222 of the neck portion 220, where the lower opening 246 is disposed proximate to, but spaced from, the first end 212 of the torch head housing 210. Similar to the first interior channel 230, the second end 244 of the second interior channel 240 may also include a second opening 248 disposed proximate to the torch head portion 250. The first interior channel 230 may be substantially straight or linear, while the second interior channel 240 may curve through the neck portion 220. In addition, the first interior channel 230 may have a larger diameter than the second interior channel 240.

Continuing with FIG. 3, the torch head portion 250 may include an exterior surface 252 and an interior cavity 254. The interior cavity 254 may be in fluid communication with the first and second interior channels 230, 240 via the second openings 238, 248 of the first and second interior channels 230, 240, respectively. In other words, the second opening 238 of the first interior channel 230 and the second opening 248 of the second interior channel 240 may open to the interior cavity 254 of the torch head portion 250. The torch head portion 250 may further include a bottom opening 256 that provides further access to the interior cavity 254 of the torch head portion 250. As explained further below, the interior cavity 254 of the torch head portion 250 may be configured to receive and retain a torch head 320 that may be configured to receive and retain a consumable assembly 328 such that the consumable assembly 328 extends out of the interior cavity 254 via the bottom opening 256.

With further reference to FIG. 3, the torch body housing 260 is illustrated as being split into two halves 260A, 260B for illustrative purposes only. As illustrated, the two halves 260A, 260B may be mirror images of one another. The torch body housing 260 may include a first end 262 (e.g., the connection end) and an opposite second end 264 (e.g., the operating end). The torch body housing 260 may include an exterior surface 270 and may define an interior or interior cavity 280. In the embodiment illustrated, the torch 200 may include a length adjustment mechanism 272 disposed on, or formed into, the exterior surface 270 of the torch body housing 260. The length adjustment mechanism 272 may include a cylindrical portion 274 and a spring loaded pin 276 that is configured to be slidably disposed within the cylindrical portion 274. The spring loaded pin 276 may have a shank that is longer in length than the cylindrical portion 274. As further explained below, the spring loaded pin 276 may be biased by a resilient member (e.g., spring) within the cylindrical portion 274 such that a portion of the spring loaded pin 276 protrudes out of bottom side of the cylindrical portion 274 and engages one of the series of notches 224 of the neck portion 220 of the torch head housing 210 to secure the location of the torch head housing 210 in a position with respect to the torch body housing 260. The knob on the top end of the spring loaded pin 276 may allow a user to retract the spring loaded pin 276 (against the biasing force) from the notches 224 and allow movement of the torch head housing 210 with respect to the torch body housing 260.

In other embodiments, instead of the spring loaded pin 276, the torch 200 may have a screw disposed within the cylindrical portion that may have a shank that is longer in length than the cylindrical portion 274. The screw may be screwed into the top side of the cylindrical portion 274 until a portion of the screw protrudes out of bottom side of the cylindrical portion 274 such that a portion of the screw engages one of the series of notches 224 of the neck portion 220 of the torch head housing 210 to secure the location of the torch head housing 210 in a position with respect to the torch body housing 260.

The interior 280 of the torch body housing 260 may be separated into three separate cavities or regions, including, but not limited to, a conduit or cylindrical passage region 282, a lower cavity 300, and a connection end cavity 310. The conduit region 282 may be disposed within the interior 280 of the torch body housing 260 proximate to the second end 264 of the torch body housing 260. The conduit region 282 may include a first end 284 and an opposite second end 286, and may be sized and shaped to receive the neck portion 220 of the torch head housing 210. Thus, in the illustrated embodiment, the conduit region 282 may be substantially cylindrical in shape. In other embodiments, however, the conduit region 282 may be of any length or shape that mirrors that of the neck portion 220 of the torch head housing 210, such that the conduit region 282 may be configured to receive the neck portion 220 of the torch head housing 210. The conduit region 282 may further include a sidewall 288 that spans from the first end 284 to the second end 286, where the sidewall 288, first end 284, and second end 286 may define the bounds of the conduit region 282. The first end 284 of the conduit region 282 includes an end wall 290, which, in turn, may include an aperture 292 that extends through the end wall 290 and a slot centrally disposed within the end wall 290 about a portion of the aperture 292. The second end 286 of the conduit region 282 may include an opening 296. The opening 296 may be disposed in the second end 264 of the torch body housing 260, and may provide access to the conduit region 282, where the neck portion 220 of the torch head housing 210 may be inserted into the conduit region 282 via the opening 296. As explained in further detail below, as the torch head housing 210 telescopes into and out of the interior 280 of the torch body housing 260, the neck portion 220 of the torch head housing 210 slides into, out of, and through the conduit region 282 via the opening 296. As further illustrated in FIGS. 3 and 4B, the sidewalls 288 include a pair of side channels 298. Each side channel 298 of the pair of side channel 298 may span a substantial portion of the length of the conduit region 282, and may be sized and shaped to receive the tabs 226 of the neck portion 220 of the torch head housing 210. As best illustrated in FIGS. 3, 5A, and 5B, a lower longitudinal slot 299 may be disposed within the sidewalls 288, where the lower longitudinal slot 299 may span a substantial portion of the length of the conduit region 282 between the first end 284 and the second end 286.

As further illustrated in FIGS. 3, 4A, 4B, 5A, and 5B, the lower cavity 300 may be disposed within the interior 280 of the torch body housing 260 proximate to the second end 264 of the torch body housing 260, and below the conduit region 282 such that the lower longitudinal slot 299 may serve as a passageway between the conduit region 282 and the lower cavity 300. Moreover, the connection end cavity 310 may be disposed within the interior 280 of the torch body housing 260 proximate to the first end 262 of the torch body housing 260. The lower cavity 300 may include a first end 302 and an opposite second end 304, where the second end 304 may be disposed proximate to the second end 264 of the torch body housing 260. The first end 302 of the lower cavity 300 may include an opening 306 that serves as a passageway between the lower cavity 300 and the connection end cavity 310. The lower cavity 300 may further include a lower trigger opening 308 that extends through the torch body housing 260 from the exterior surface 270 of the torch body housing 260 to the interior 280. As further illustrated, the connection end cavity 310 may also include a first end 312 and an opposite second end 314. The first end 312 of the connection end cavity 310 may be disposed proximate to the first end 262 of the torch body housing 260, and the first end 312 may include an opening 316 that is also formed in the first end 262 of the torch body housing 260. The second end 314 of the connection end cavity 310 may be disposed proximate to the first end 284 of the conduit region 282 and the first end 302 of the lower cavity 300. The aperture 292 of the conduit region 282 may serve as a passageway through the end wall 290 of the first end 284 of the conduit region 282 between the conduit region 282 and the connection end cavity 310. Furthermore, as previously explained, the opening 306 of the lower cavity 300 may serve as a passageway between the lower cavity 300 and the connection end cavity 310.

Figure 5A:
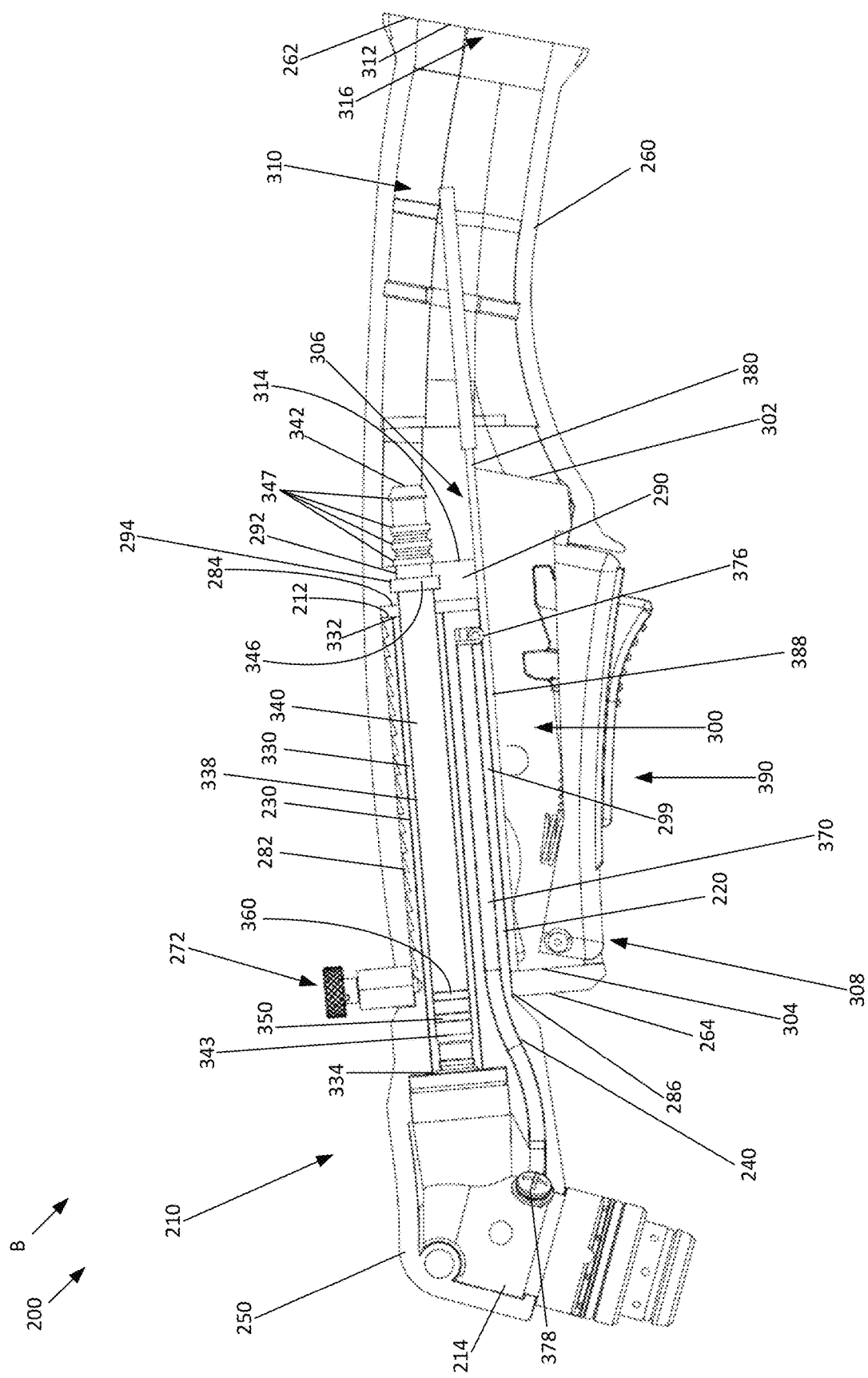
FIG. 5A is a cross-sectional view of the first example embodiment of the torch illustrated in FIG. 2A, where the torch is in the fully collapsed configuration.
Figure 5B:
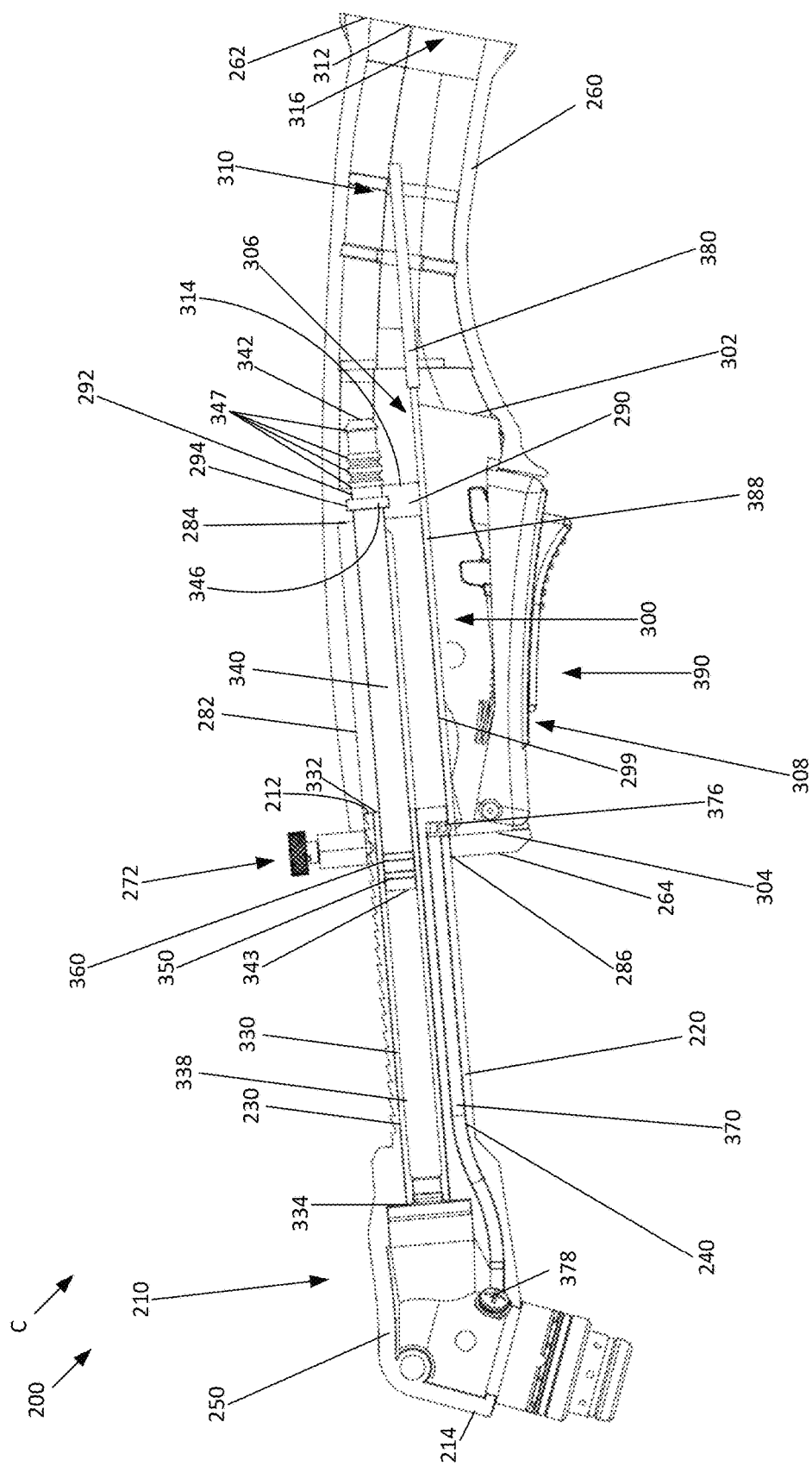
FIG. 5B is a cross-sectional view of the first example embodiment of the torch illustrated in FIG. 2A, where the torch is in the fully expanded configuration.
Figure 6A:
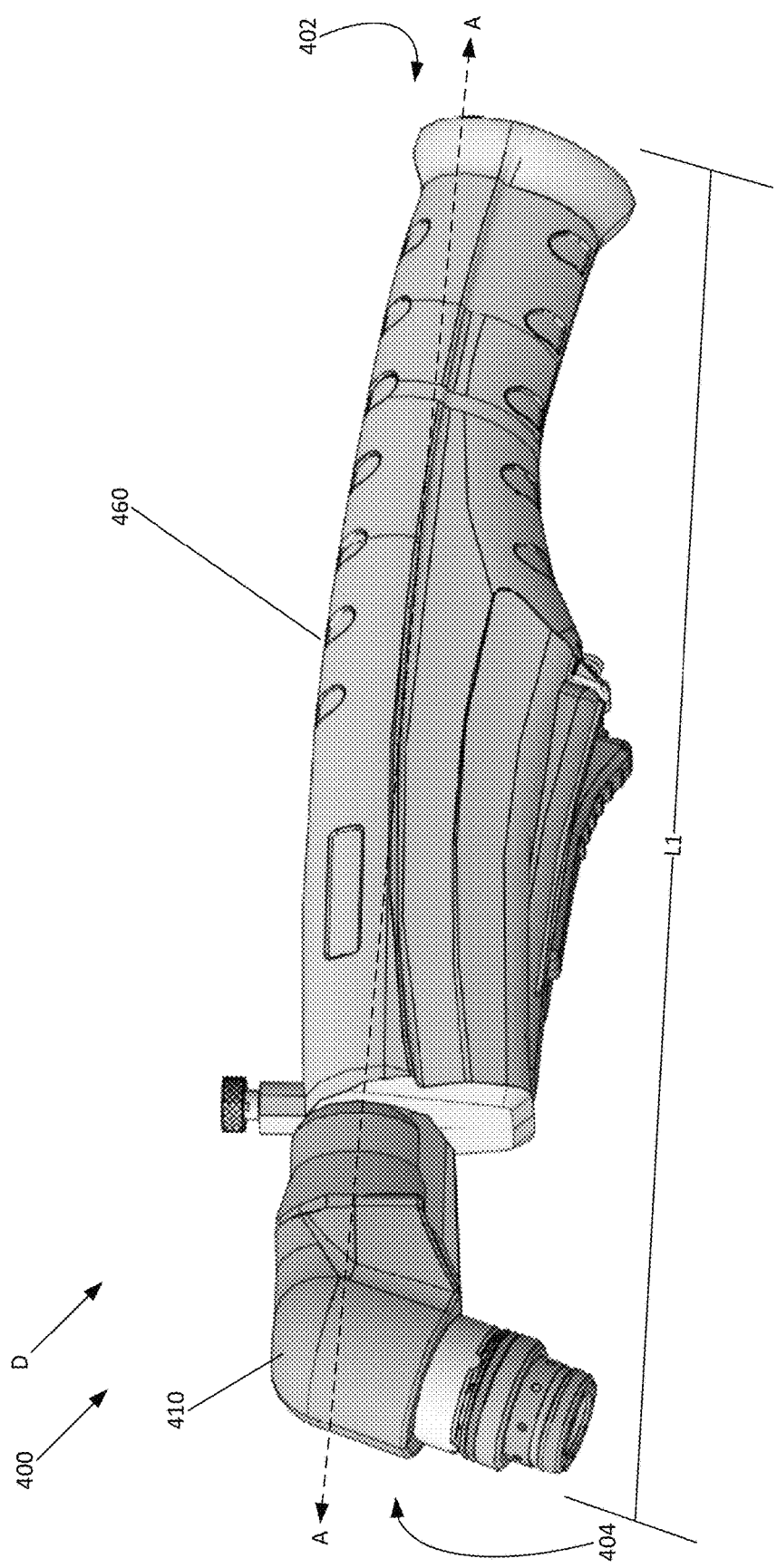
FIG. 6A is a perspective view of a second example embodiment of a torch according to the present disclosure, where the torch is in the fully collapsed configuration.
Figure 6B:
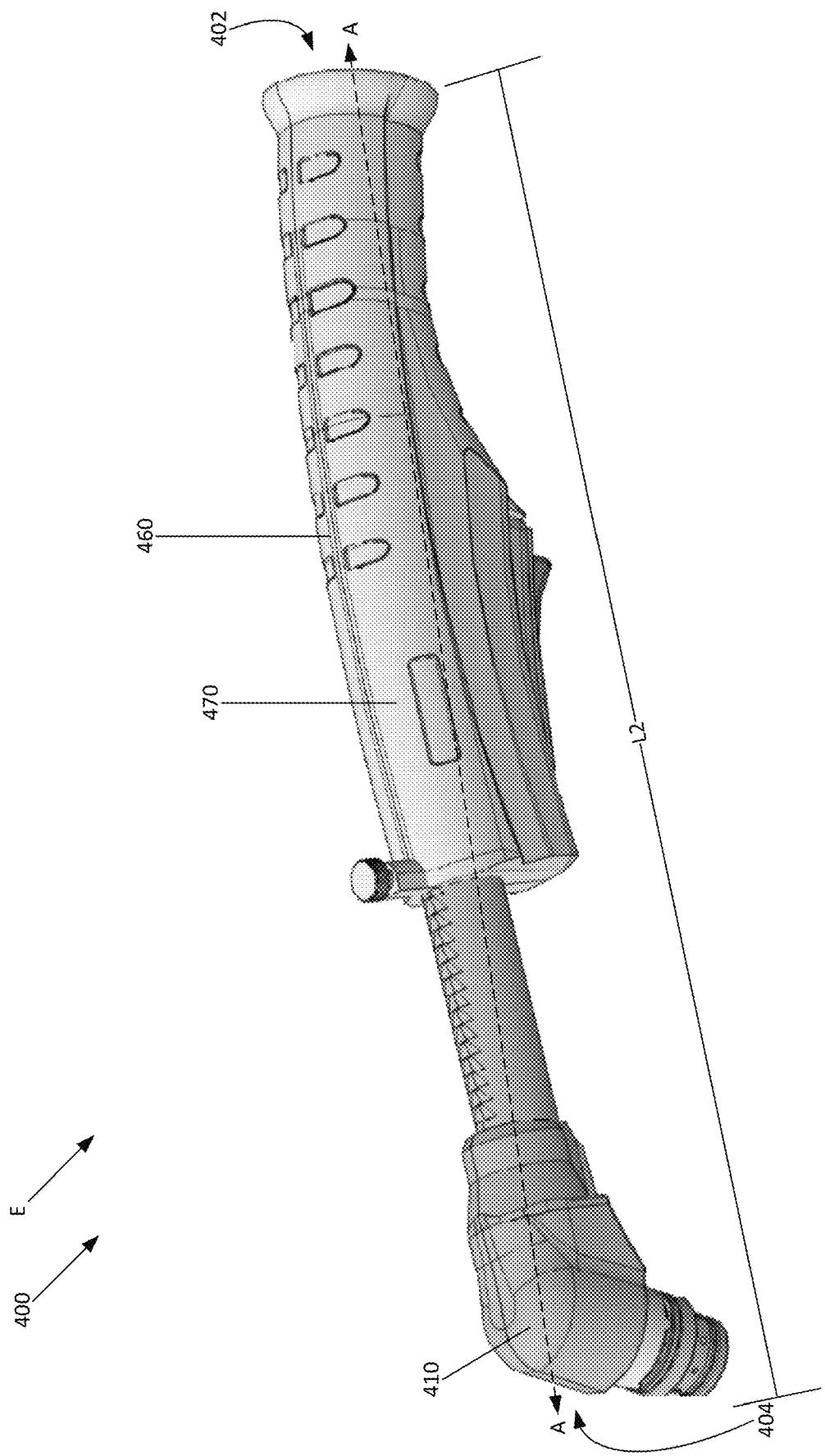
FIG. 6B is a perspective view of the second example embodiment of the torch illustrated in FIG. 6A, where the torch is in the fully expanded configuration.

With continued reference to FIGS. 3, 5A, and 5B, the torch 200 may include a torch head 320. The torch head 320 may include a first end 322 and a second end 324 opposite the first end 322. As illustrated, the torch head 320 may be substantially cylindrical. In other embodiments, however, the torch head 320 may be of any other shape. The torch head 320 may include a sidewall 325 extending between the first end 322 and the second end 324. The torch head 320 may further include a connector extension 326 extending radially from the sidewall 325 of the torch head 320 proximate to the first end 322. As further illustrated in FIGS. 3, 5A, and 5B, the second end 324 of the torch head 320 may be configured to receive and removably retain a consumable assembly 328. The torch head 320 may also include a pilot connector opening 329 disposed within the sidewall 325 at a location between the first end 322 and the second end 324 of the torch head 320. The pilot connector opening 329 may extend through the sidewall 325 to be in communication/aligned with a portion of the consumable assembly 328 when the consumable assembly 328 is disposed within the second end 324 of the torch head 320.

As further illustrated in FIGS. 3, 5A, and 5B, the torch 200 also includes a conductor tube 330 that is configured to be coupled to, and extend from, the connector extension 326 of the torch head 320. The conductor tube 330 may be an elongated cylindrical tube having a first end 332 and an opposite second end 334 coupled to the connector extension 326 of the torch head 320. The conductor tube 330 may have a sidewall 336 that extends along the length of the conductor tube 330 from the first end 332 to the second end 334. The sidewall 336 may define a central passage 338 that extends along the length of the conductor tube 330 from the first end 332 to the second end 334. In other embodiments, the conductor tube 330 may be of any other shape. The conductor tube 330 may be at least partially constructed of any material suitable for conductivity including, but not limited to, brass, copper, etc.

As illustrated in FIGS. 3, 5A, and 5B, the torch head 320 and the conductor tube 330 are configured to be disposed, housed, or located within the torch head housing 210. More specifically, the torch head 320 may be at least partially disposed within the interior cavity 254 of the torch head portion 250 of the torch head housing 210 such that the torch head 320 at least partially extends out of the bottom opening 256 of the torch head portion 250. Thus, the second end 324 of the torch head 320, along with a portion of the consumable assembly 328 when attached to the torch head 320, is disposed outside of the torch head housing 210. With the torch head 320 disposed within the interior cavity 254 of the torch head portion 250 of the torch head housing 210, the conductor tube 330 extends from the connector extension 326 through the first interior channel 230 of the neck portion 220 of the torch head housing 210. As best illustrated in FIGS. 5A and 5B, the conductor tube 330 extends through the first interior channel 230 of the neck portion 220 of the torch head housing 210 such that the first end 332 of the conductor tube 330 may be disposed proximate to, located at, or oriented in alignment with, the first end 232 of the first interior channel 230. In other words, the conductor tube 330 extends through the first interior channel 230 of the neck portion 220 of the torch head housing 210 from the first end 232 of the first interior channel 230 to the second end 234 of the first interior channel 230 such that the first end 332 of the conductor tube 330 is disposed proximate to, located at, or oriented in alignment with, the first end 212 of the torch head housing 210.

Continuing with FIGS. 3, 5A, and 5B, the torch 200 also includes a conductor extension tube 340. Similar to the conductor tube 330, the conductor extension tube 340 may be an elongated cylindrical tube having a first end 342 and an opposite second end 343. The conductor extension tube 340 may have a sidewall 344 that extends along the length of the conductor extension tube 340 from the first end 342 to the second end 343. The sidewall 344 may define a central passage 345 that extends along the length of the conductor extension tube 340 from the first end 342 to the second end 343. In other embodiments, the conductor extension tube 340 may be of any other shape. Furthermore, the conductor extension tube 340 may be at least partially constructed of any material suitable for conductivity including, but not limited to, brass, copper, etc. As further illustrated in FIGS. 3, 5A, and 5B, the conductor extension tube 340 may include a flange 346 that extends radially outward from the sidewall 344 at a location disposed between the first end 342 and the second end 343, but disposed more proximate to the first end 342 than the second end 343. The conductor extension tube 340 may also include a set of connector flanges 347 extending radially outward from the sidewall 344 proximate to the first end 342 of the conductor extension tube 340. The set of connector flanges 347 may be smaller in diameter than the flange 346, and may be configured to connect to electrical wires configured to carry current. The conductor extension tube 340 may also include a first annular depression 348 and a second annular depression 349 disposed within the sidewall 344 of the conductor extension tube 340 proximate to the second end 343 of the conductor extension tube 340. The conductor extension tube 340 may be smaller in diameter than the conductor tube 330. More specifically, the outer diameter of the conductor extension tube 340 may be less than the diameter of the central passage 338 of the conductor tube 330.

As further illustrated in FIGS. 3, 5A, and 5B, the conductor extension tube 340 may be primarily disposed within the interior 280 of the torch body housing 260. More specifically, the flange 346 of the conductor extension tube 340 may be disposed within the slot 294 around the aperture 292 of the end wall 290 between the conduit region 282 and the connection end cavity 310 of the interior 280 of the torch body housing 260. Thus, the conductor extension tube 340 is primarily disposed within the interior 280 of the torch body housing 260, where the first end 342 is disposed within the connection end cavity 310 of the interior 280 of the torch body housing 260, and where a portion of the conductor extension tube 340 extends through the conduit region 282 of the interior 280 of the torch body housing 260 such that the second end 343 of the conductor extension tube 340 extends out of the opening 296 of the second end 286 of the conduit region 282. Thus, the conductor extension tube 340 extends through the aperture 292 of the end wall 290. The disposition of the flange 346 within the slot 294 of the end wall 290 of the conduit region 282 secures the location of the conductor extension tube 340 within the interior 280 of the torch body housing 260.

As further illustrated in FIGS. 5A and 5B, an air seal gasket 350 may be disposed within the first annular depression 348 of the conductor extension tube 340, while a conductive compliant contact 360 may be disposed within the second annular depression 349 of the conductor extension tube 340. FIGS. 5A and 5B further illustrate that, with the torch head housing 210 coupled to the torch body housing 260, and specifically the neck portion 220 of the torch head housing 210 being slidably disposed within the conduit region 282 of the torch body housing 260, the second end 343 of the conductor extension tube 340, along with the air seal gasket 350 and conductive compliant contact 360, may be disposed within the central passage 338 of the conductor tube 330 via the first end 332 of the conductor tube 330. As further explained below, regardless of the position of the torch head housing 210 with regard to the torch body housing 260 (i.e., regardless of whether the torch 200 is in the collapsed position B or the expanded position C), the second end 343 of the conductor extension tube 340, the air seal gasket 350, and conductive compliant contact 360 may be disposed within the central passage 338 of the conductor tube 330.

In some embodiments, the conductive compliant contact 360 may be coupled to the conductor extension tube 340 such that the conductive compliant contact 360 is integrally built into the conductor extension tube 340. In other words, the conductive compliant contact 360 and the conductor extension tube 340 may be formed uniformly with one another (i.e., the conductive compliant contact 360 and the conductor extension tube 340 may be formed together as one singular structure rather than the conductive compliant contact 360 being a separate element attached to the conductor extension tube 340).

Continuing with FIGS. 3, 5A, and 5B, the torch 200 further includes a first pilot wire 370 and a second pilot wire 380. The first pilot wire 370 may be elongated and may include a first end 372 and an opposite second end 374. The first end 372 of the first pilot wire 370 may include a pilot return contact 376. Moreover, the second end 374 of the first pilot wire 370 may be coupled to, or disposed within, the pilot connector opening 329 of the torch head 320 via a fastener or connector 378. As further illustrated, the first pilot wire 370 may be disposed within the second interior channel 240 of the neck portion 220 of the torch head housing 210 such that the pilot return contact 376 extends out of the lower opening 246 of the first end 242 of the second interior channel 240 and downwardly from the neck portion 220 of the torch head housing 210.

The second pilot wire 380, like the first pilot wire 370, may be elongated and include a first end 382 and an opposite second end 383. The second pilot wire 380 may further be divided into a first segment 384, which is encased in a wire housing and disposed more proximate to the first end 382 than the second end 383, and a second segment 386, which includes an exposed contact portion 388 and is disposed more proximate to the second end 383 than the first end 382. As best illustrated in FIGS. 5A and 5B, the second pilot wire 380 may be disposed within the torch body housing 260 such that the second pilot wire 380 extends through both the lower cavity 300 and the connection end cavity 310, and through the opening 306 between the lower cavity 300 and the connection end cavity 310. More specifically, the first end 382 and the first segment 384 of the second pilot wire 380 may be disposed within the connection end cavity 310, while the second end 383 and the second segment 386 of the second pilot wire 380 may be disposed within the lower cavity 300 proximate to lower longitudinal slot 299 of the sidewall 288 of the conduit region 282. FIGS. 5A and 5B further illustrate that the second end 383 of the second pilot wire 380 may be disposed adjacent to, in abutment with, or proximate to the second end 304 of the lower cavity 300 (i.e., the second end 264 of the torch body housing 260). Thus, as illustrated in FIGS. 5A and 5B, with the neck portion 220 of the torch head housing 210 disposed within the conduit region 282 of the torch body housing 260, the pilot return contact 376 extends downwardly from the neck portion 220 of the torch head housing 210, through the lower longitudinal slot 299 of the sidewall 288 of the conduit region 282 of the torch body housing 260, and into contact with the exposed contact portion 388 of the second pilot wire 380 to establish an electrical pilot connection between the first pilot wire 370 and the second pilot wire 380. As further illustrated in FIGS. 5A and 5B, as the torch head housing 210 slides into and out of the torch body housing 260 the collapsed position B and the expanded position C, the pilot return contact 376 of the first pilot wire 370 slides or drags along the exposed contact portion 388 of the second pilot wire 380 to maintain the electrical connection between the first pilot wire 370 and the second pilot wire 380.

As further illustrated in FIGS. 3, 5A, and 5B, the torch 200 may also include a trigger 390 that may be at least partially disposed within the lower cavity 300 of the torch body housing 260. As illustrated, the trigger 390 may at least partially extend out of the torch body housing 260 through the lower trigger opening 308. The trigger 390 may be configured to be depressed into the torch body housing 260 to activate the torch 200.

Figure 4A:
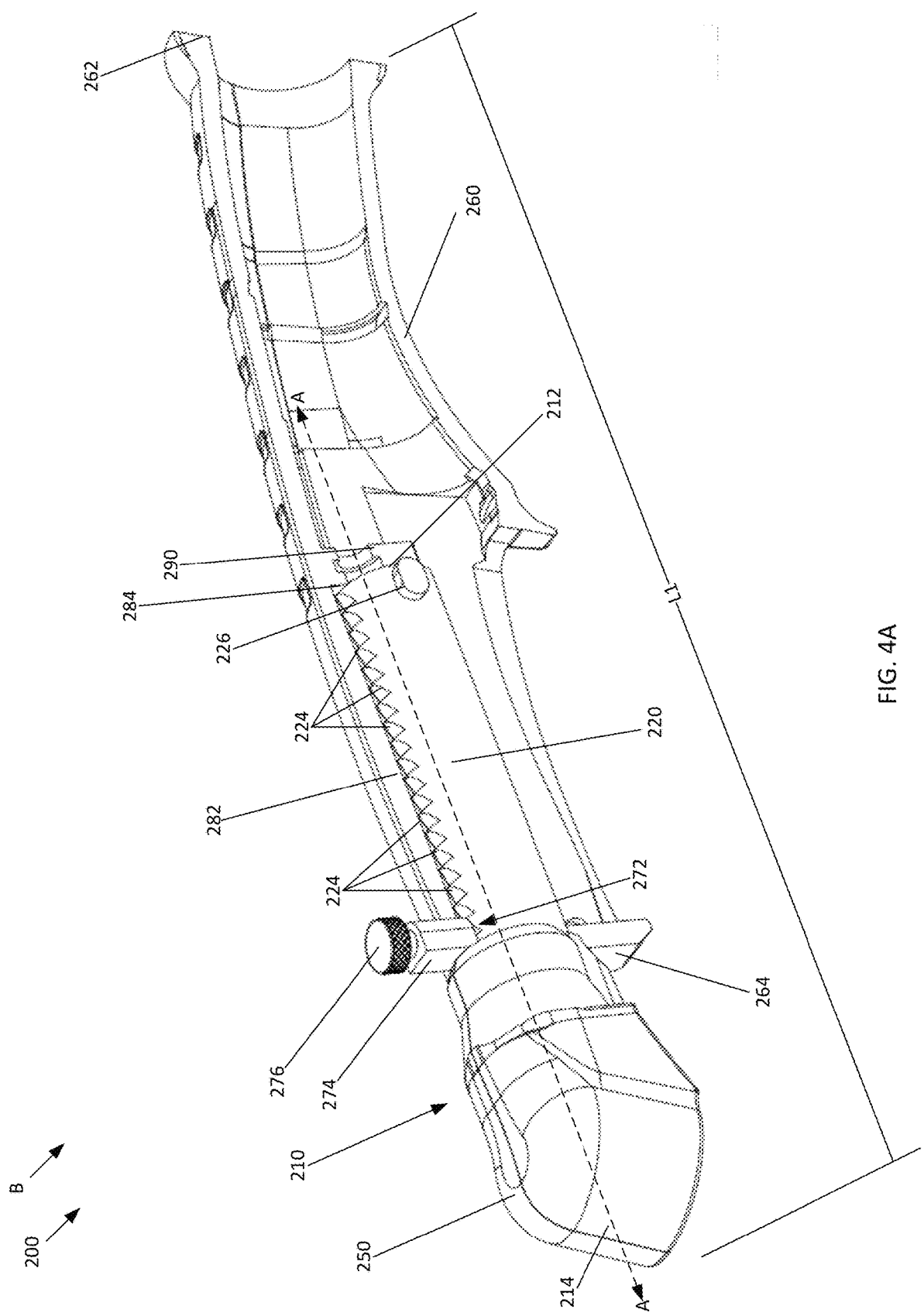
FIG. 4A is a partial sectional view of the torch body of the first example embodiment of the torch illustrated in FIG. 2A, where the torch head housing is in the fully collapsed configuration.
Figure 4B:
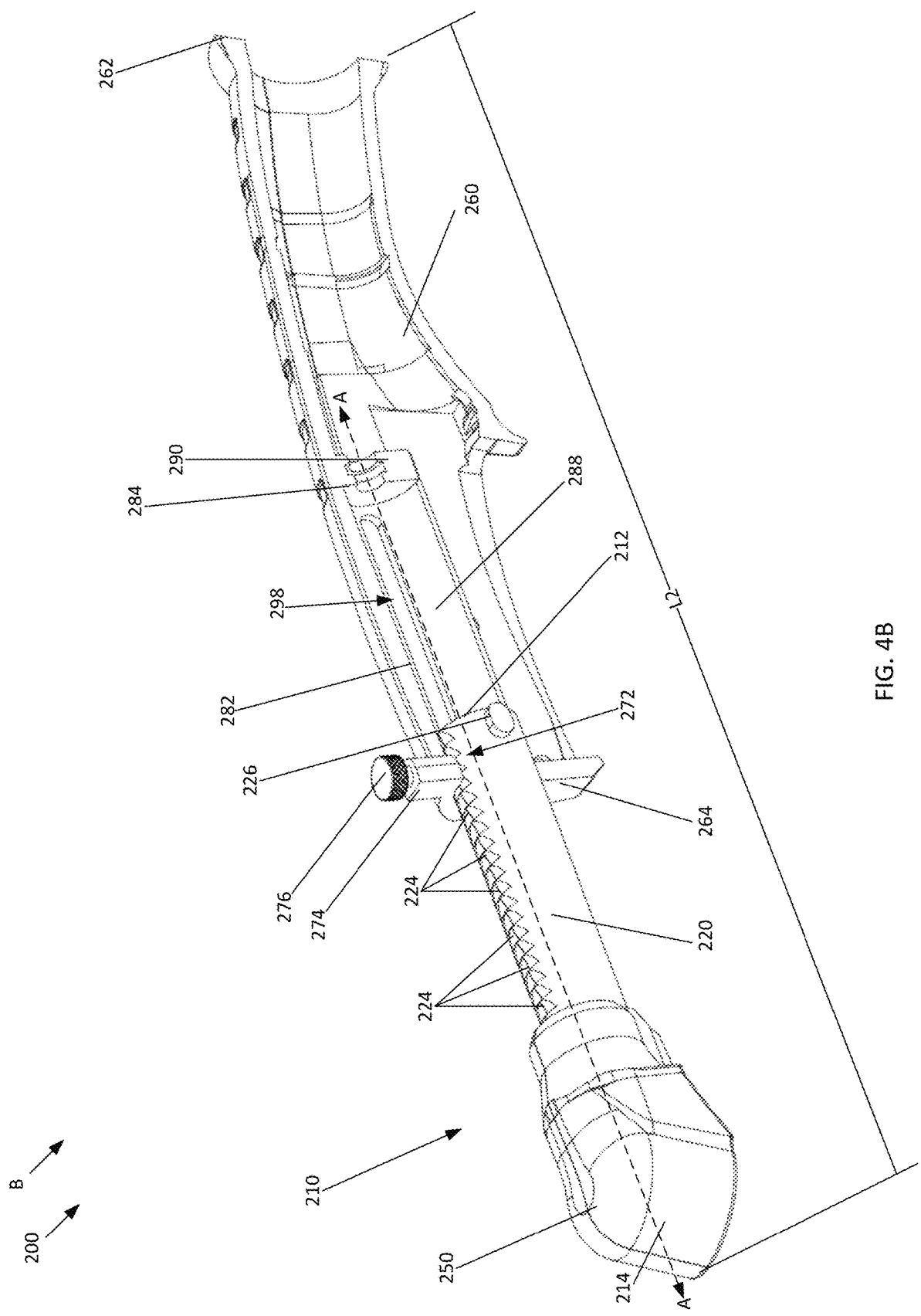
FIG. 4B is a partial sectional view of the torch body of the first example embodiment of the torch illustrated in FIG. 2A, where the torch head housing is in the fully expanded configuration.

Turning to FIGS. 4A and 4B, illustrated are isolated views of the torch head housing 210 and the torch body housing 260. FIG. 4A illustrates the torch head housing 210 in the collapsed position B with respect to the torch body housing 260, while FIG. 4B illustrates the torch head housing 210 in the expanded position C with respect to the torch body housing 260. As previously explained, the neck portion 220 of the torch head housing 210 is configured to slide into and out of the conduit region 282 of the torch body housing 260 along axis A. As illustrated in FIG. 4A, when in the collapsed position B, the first end 212 of the torch head housing 210 is disposed proximate to first end 284 of the conduit region 282 and the end wall 290 of the conduit region. In the collapsed position B, the neck portion 220 of the torch head housing 210 may be fully disposed within the conduit region 282 of the torch body housing 260. Thus, the torch head portion 250 of the torch head housing 210 may be disposed proximate to, or in abutment with, the second end 264 of the torch body housing 260. In this configuration, the torch 200 has a length of L1. Conversely, in the expanded position C, the neck portion 220 of the torch head housing 210 may only be partially disposed within the conduit region 282 of the torch body housing 260. When fully expanded, as illustrated in FIG. 4B, the first end 212 of the torch head housing 210 is still disposed within the conduit region 282 of the torch body housing 260, but is disposed more proximate to the second end 286 of the conduit region 282 of the torch body housing 260 (i.e., the second end 264 of the torch body housing 260) than the first end 284 of the conduit region 282 of the torch body housing 260. Thus, the torch head portion 250 of the torch head housing 210 may be spaced from the second end 264 of the torch body housing 260 with a portion of the neck portion 220 of the torch head housing 210 being exposed. In this configuration, the torch 200 has a length of L2. As the torch head housing 210 slides or telescopes into and out of the conduit region 282 of the torch body housing 260, the pair of tabs 226 of the neck portion 220 are disposed within, and slide along, the pair of side channels 298 of the sidewalls 288. This interaction between the pair of tabs 226 and the pair of side channels 298 serves two purposes. First, it prevents the torch head housing 210 from rotating about axis A with respect to the torch body housing 260 (i.e., prevents axial rotation of the torch head housing 210 with respect to the torch body housing 260 and vice versa). In addition, the interaction between the pair of tabs 226 and the pair of side channels 298 prevents the torch head housing 210 from sliding or telescoping too far such that the first end 212 slides completely out of the conduit region 282 of the torch body housing 260 (i.e., prevents the neck portion 220 from sliding completely out of the conduit region 282 of the torch body housing 260).

Continuing with FIGS. 4A and 4B, when the torch head housing 210 is in the collapsed position B, the spring loaded pin 276 of the length adjustment mechanism 272 of the torch body housing 260 may be biased through the cylindrical portion 274 of the length adjustment mechanism 272 until a portion of the spring loaded pin 276 protrudes out of bottom side of the cylindrical portion 274 such that the protruding portion of the spring loaded pin 276 engages one of the series of notches 224 of the neck portion 220 of the torch head housing 210 located proximate to the torch head portion 250 in order to secure the torch head housing 210 in the collapsed position B with respect to the torch body housing 260. Conversely, when the torch head housing 210 is in the expanded position C, the spring loaded pin 276 of the length adjustment mechanism 272 of the torch body housing 260 may be biased through the cylindrical portion 274 of the length adjustment mechanism 272 until a portion of the spring loaded pin 276 protrudes out of bottom side of the cylindrical portion 274 such that the protruding portion of the spring loaded pin 276 engages one of the series of notches 224 of the neck portion 220 of the torch head housing 210 located proximate to the first end 212 of the torch head housing 210 in order to secure the torch head housing 210 in the expanded position C with respect to the torch body housing 260. While not illustrated, the protruding portion of the spring loaded pin 276 of the length adjustment mechanism 272 may be configured to engage any one of the series of notches 224 of the neck portion 220 of the torch head housing 210 in a manner similar to that shown and described with regard to FIGS. 4A and 4B to secure the torch head housing 210 in any position with respect to the torch body housing 260 between the collapsed position B and the expanded position C. Thus, the torch 200 may be configured to have any length between L1 (with the torch head housing 210 in the collapsed position B) and L2 (with the torch head housing 210 in the expanded position C)

Turning to FIGS. 5A and 5B, illustrated are cross-sectional views of the torch 200 with the torch head housing 210 in the collapsed position B with respect to the torch body housing 260 (FIG. 5A), and the torch head housing 210 in the expanded position C with respect to the torch body housing 260 (FIG. 5B). As illustrated, and previously explained, at least a portion of the conductor extension tube 340, including the second end 343 of the conductor extension tube 340, is inserted into the first end 332 of the conductor tube 330 and disposed within the central passage 338 of the conductor tube 330. As further illustrated, regardless of the position of the torch head housing 210 with respect to the torch body housing 260, the central passage 345 of the conductor extension tube 340 is coaxially aligned with the central passage 338 of the conductor tube 330, as well as being in fluid communication with the central passage 338 of the conductor tube 330. While not illustrated, when the torch lead or cable hose is coupled to the first end 262 of the torch body housing 260, the first end 342 of the conductor extension tube 340, which is disposed within the connection end cavity 310 of the torch body housing 260, is coupled to the main power supply and the gas/air supply lines. The gas/air supply may be supplied to the torch head 320, and ultimately the consumable assembly 328, via the central passage 338 of the conductor tube 330 and the central passage 345 of the conductor extension tube 340. The air seal gasket 350 prevents gas/air from leaking between the conductor tube 330 and the conductor extension tube 340 because the air seal gasket 350 remains in contact with the exterior surface of the sidewall 344 of the conductor extension tube 340 and the interior surface (i.e., the surface of the central passage 338) of the conductor tube 330. Moreover, the main power may be supplied to the torch head 320, and ultimately the consumable assembly 328, via the conductor tube 330 and conductor extension tube 340 because both are at least partially constructed from conductive materials. The conductive compliant contact 360 disposed in the second annular depression 349 of the second end 343 of the conductor extension tube 340, and disposed within the central passage 338 of the conductor tube 330, is configured to maintain a conductive connection between the conductor tube 330 and the conductor extension tube 340 (i.e., the conductive compliant contact 360 remains in contact with the exterior surface of the sidewall 344 of the conductor extension tube 340 and the interior surface of the central passage 338 of the conductor tube 330) as the torch head housing 210 slides or telescopes into and out of the torch body housing 260 (and as the second end 343 of the conductor extension tube 340 slides or telescopes through the central passage 338 of the conductor tube 330). Thus, the main power may be transferred from the torch lead or cable hose, through the conductor extension tube 340, through the conductive compliant contact 360, through the conductor tube 330, to the torch head 320, and ultimately to the consumable assembly 328.

As further illustrated in FIGS. 5A and 5B, and as previously explained, the first pilot wire 370 may be disposed within the second interior channel 240 of neck portion 220 of the torch head housing 210, while the second pilot wire 380 may be disposed within the torch body housing 260 such that the second pilot wire 380 extends through both the lower cavity 300 and the connection end cavity 310. Moreover, as previously explained, as the torch head housing 210 slides into and out of the torch body housing 260 between the collapsed position B and the expanded position C, the pilot return contact 376 of the first pilot wire 370, which extends out of the lower opening 246 on the bottom side of the neck portion 220 of the torch head housing 210 proximate to the first end 212 of the torch head housing 210, slides or drags along the exposed contact portion 388 of the second pilot wire 380 to maintain the electrical connection between the first pilot wire 370 and the second pilot wire 380. While not illustrated, the first end 382 of the second pilot wire 380 may be coupled to the pilot line of a torch lead or cable hose when the torch lead or cable hose are coupled to the first end 262 of the torch body housing 260. Thus, the first pilot wire 370 and the second pilot wire 380 are configured to maintain a connection with one another, through the abutment of the pilot return contact 376 of the first pilot wire 370 with any part or portion of the exposed contact portion 388 of the second pilot wire 380 to transfer the pilot electrical signal from the consumable assembly 328 of the torch head 320 to the torch lead or cable hose.

Turning to FIGS. 6A, 6B, 7A, and 7B, illustrated is a second embodiment of the torch 400. The second embodiment of the torch 400 is substantially similar to the first embodiment of the torch 200 in that the torch 400 includes many of the same components as the first embodiment of the torch 200, and operates in a substantially similar manner such that portions of the torch 400 telescope or slide with respect to other portions between a collapsed position D and an expanded position E (i.e., the length of the torch 400 is also adjustable). For example, like the first embodiment of the torch 200, the second embodiment of the torch 400 includes a torch head housing 410, a torch head 520 disposed within the torch head portion 450 of the torch head housing 410, and a conductor tube 530 disposed within the neck portion 420 of the torch head housing 410. The torch head housing 410 of the torch 400 may be substantially similar to the torch head housing 210 of the first embodiment of the torch 200 except that unlike the second interior channel 240 of the neck portion 220 of the torch head housing 210, the second interior channel 440 of the neck portion 420 of the torch head housing 410 may extend entirely through the neck portion 420 from the torch head portion 450 to the first end 402 of the torch head housing 410. Thus, the first end 402 of the torch head housing 410 may have two openings disposed in it, the opening 436 of the first end 432 of the first interior channel 430, within which the conductor tube 530 is disposed, and the opening 446 of the first end 442 of the second interior channel 440.

In addition, like the first embodiment of the torch 200, the second embodiment of the torch 400 may also similarly include a torch body housing 460 having an exterior surface 470 with an adjustment mechanism 472 with an interior 480 with a conduit region 482, lower cavity 500, and connection end cavity 510. Unlike the torch body housing 260 of the first embodiment of the torch 200, the end wall 490 between the conduit region 482 and the connection end cavity 510 of the torch body housing 460 of second embodiment of the torch 400 includes a first aperture 492, which is similar to the aperture 292 of the end wall 490 of the torch 200, and a second aperture 496. Both the first and second apertures 492, 496 extend through the end wall 490 between the conduit region 482 and the connection end cavity 510. Furthermore, the conduit region 482 may not include a lower longitudinal slot disposed within the sidewalls 488 like that of the conduit region 282 of the torch body housing 260 of the first embodiment of the torch 200. In addition, the connection end cavity 510 may include a curved passageway 518 disposed within the connection end cavity 510 proximate to the second end 514 of the connection end cavity 510 and the end wall 490.

Similar to the first embodiment of the torch 200, the second embodiment of the torch 400 includes a conductor extension tube 540 that is substantially similar to the conductor extension tube 340 in that the conductor extension tube 540 may be disposed within the first aperture 492 of the end wall 490, may include a flange 546 that is disposed within the slot 494 around the first aperture 492 of the end wall 490, may extend through the conduit region 482 of the torch body housing 460, may include an air seal gasket 550 disposed within a first annular depression 548 located proximate to the second end 543 of the conductor extension tube 540, and may include a conductive compliant contact 560 disposed within the second annular depression 549 located proximate to the second end 543 of the conductor extension tube 540. Moreover, the conductor extension tube 540, like the conductor extension tube 340, may be smaller in diameter than the conductor tube 530 such that the second end 543 of the conductor extension tube 540 may be disposed within the central passage 538 of the conductor tube 530. Thus, the conductor tube 530 may be configured to slide over the conductor extension tube 540, or the conductor extension tube 540 may slide within the central passage 538 of the conductor tube 530, as the torch head housing 410 is repositioned between the collapsed position D and the expanded position E with respect to the torch body housing 460.

Figure 7A:
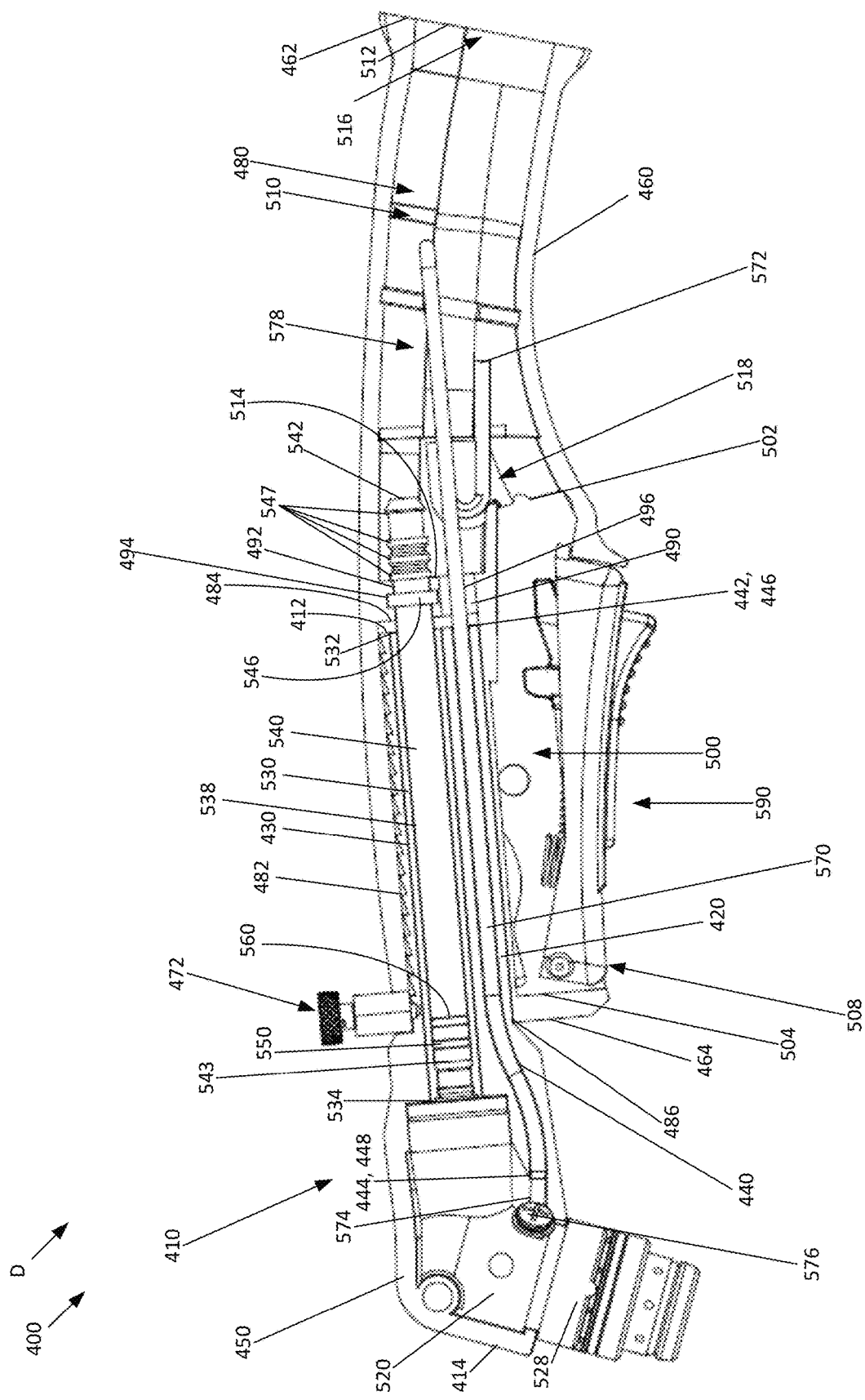
FIG. 7A is a cross-sectional view of the second example embodiment of the torch illustrated in FIG. 6A, where the torch is in the fully collapsed configuration.
Figure 7B:
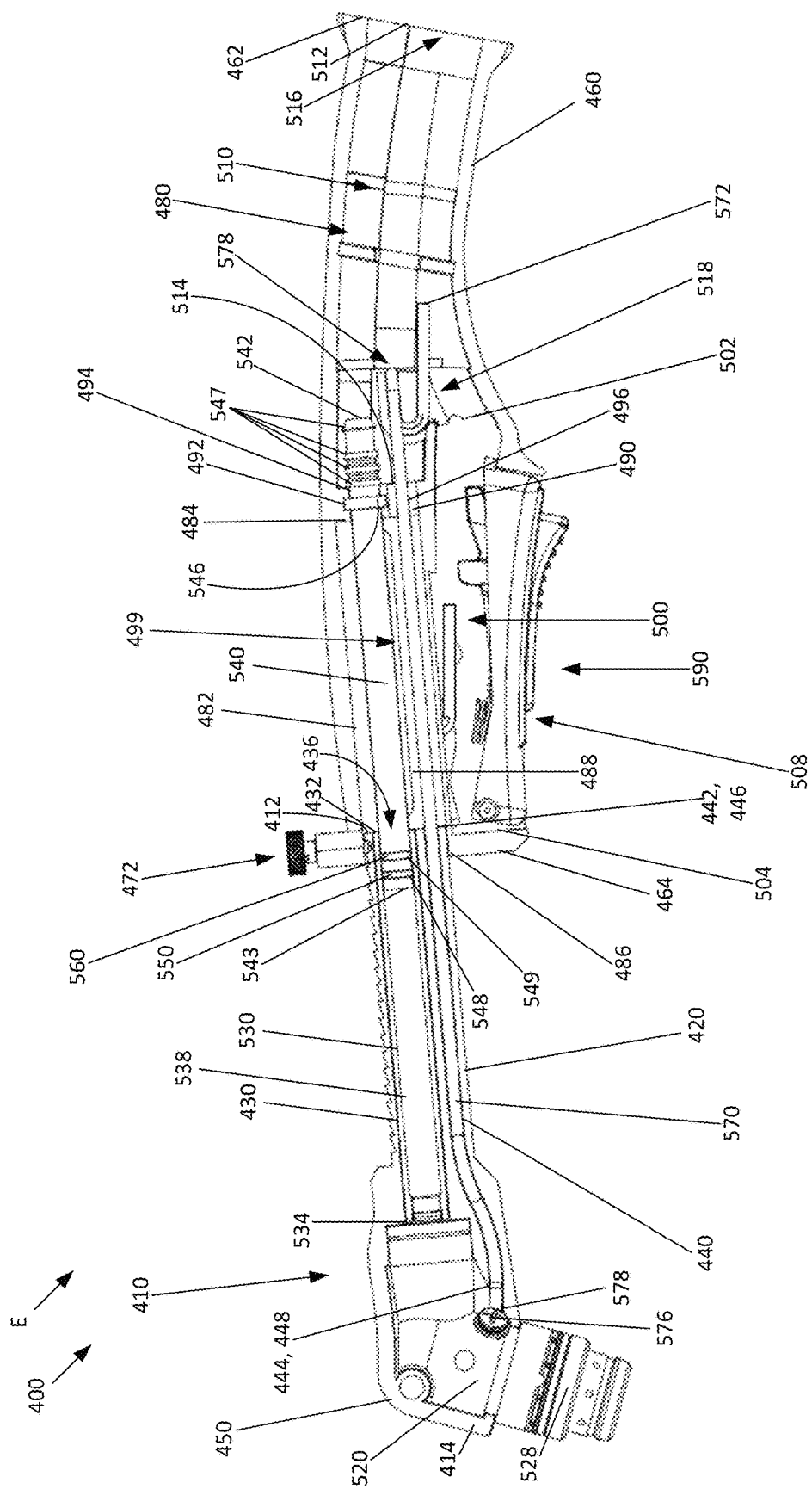
FIG. 7B is a cross-sectional view of the second example embodiment of the torch illustrated in FIG. 6A, where the torch is in the fully expanded configuration.

The second embodiment of the torch 400 may further differ from the first embodiment of the torch 200 in that the second embodiment of the torch 400 may include a single flexible pilot return wire 570 rather than a first pilot wire 370 with a pilot return contact 376 that drags along the exposed contact portion 388 of a second pilot wire 380. As best illustrated in FIGS. 7A and 7B, the flexible pilot return wire 570 may have a first end 572 disposed within the interior 480 of the torch body housing 460 and an opposite second end 574 that may be coupled to, or disposed within, the pilot connector opening 529 (not shown) of the torch head 520 via a fastener or connector 576. The flexible pilot return wire 570 may extend through the second interior channel 440 of the neck portion 420 of the torch head housing 410, through the conduit region 482 of the torch body housing 460, through the second aperture 496 of the end wall 490 of the conduit region 482, and through the curved passageway 518 of the connection end cavity 510. As illustrated best in FIG. 7A, when the torch head housing 410 is in the collapsed position D, the flexible pilot return wire 570 has an excess or bunched segment 578 that gathers in the connection end cavity 510. Disposing the flexible pilot return wire 570 within the curved passageway, which may be substantially U shaped, causes the excess segment 578 of the flexible pilot return wire 570 to bunch up or gather within the connection end cavity 510. However, as shown in FIG. 7B, as the torch head housing 410 telescopes out of the conduit region 482 of the torch body housing 460, the flexible pilot return wire 570 is pulled through the second aperture 496 of the end wall 490 of the conduit region 482, and through the conduit region 482, which reduces the amount of the excess segment 578 of the flexible pilot return wire 570 within the connection end cavity 510. As illustrated in both FIGS. 7A and 7B, the flexible pilot return wire 570 is a continuous wire, and may be configured to transfer the pilot electrical signal from the consumable assembly 528 of the torch head 520, which may be coupled to the second end 574 of the flexible pilot return wire 570, to the torch lead or cable hose, which may be coupled to the first end 572 of the flexible pilot return wire 570.

Turning to FIGS. 8A, 8B, 9A-9C, 10A, and 10B, illustrated is a third embodiment of the torch 600. The third embodiment of the torch 600 may be substantially elongated with a first end 602 and an opposite second end 604. Like the first two embodiments, third embodiment of the torch 600 may be configured to telescope, axially extend, or expand along a longitudinal axis A that spans from at least the first end 602 to the second end 604. The third embodiment of the torch 600 may be configured to telescope or axially extend between a fully collapsed configuration F (shown in FIGS. 8A and 10A), a fully expanded configuration G (shown in FIGS. 8B and 10B), and any number of intermediate positions between the fully collapsed configuration F and the fully expanded configuration G. Like the previous embodiments of the torch 200, 400, the illustrated third embodiment of the torch 600 includes a first portion, or torch head housing, 610 and a second portion, or torch body housing, 640. The torch body housing 640 may further be referred to herein as a sleeve or the handle. As further explained below, the torch head housing 610 may be configured to axially slide into and out of the torch body housing 640 between the fully collapsed configuration F and the fully expanded configuration G. In some further embodiments, the torch head housing 610 may be configured to axially rotate with respect to the torch body housing 640, and vice versa.

Figure 9A:
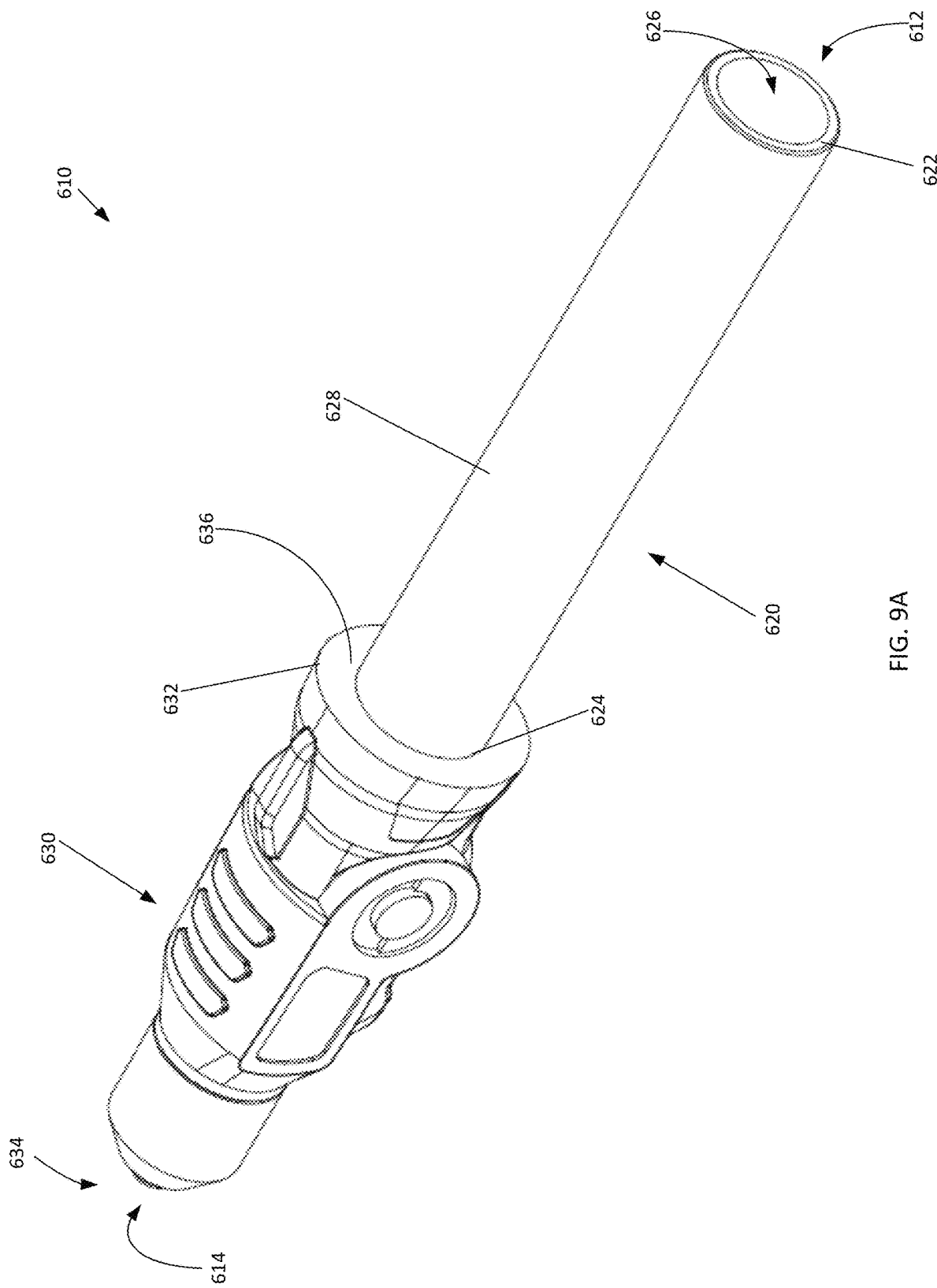
FIG. 9A is a perspective view of the torch head portion of the third example embodiment of the torch illustrated in FIG. 8A.

As best illustrated in FIG. 9A, which is an isolated view of the torch head housing 610, the torch head housing 610 includes a first end 612 (i.e., connection end) and an opposite second end 614 (i.e., consumable end). The torch head housing 610 may further include a neck portion 620 and a torch head portion 630. In some embodiments, as illustrated in FIG. 9A, the neck portion 620 may be an annular cylinder with a first end 622 and an opposite second end 624. The neck portion 620 may define a conduit 626 that spans through the neck portion 620 from the first end 622 to the second end 624. The neck portion 620 may also contain an exterior surface 628. In some other embodiments, the neck portion 620 may have another shape, such as, but not limited to, a square conduit, rectangular conduit, pentagonal conduit, etc. The torch head portion 630 of the torch head housing 610 may also include a first end 632, which is coupled to the second end 624 of the neck portion 620, and an opposite second end 634. The torch head portion 630 may be configured to removably receive a consumable or consumable assembly. While not illustrated, the torch head portion 630 may define an interior cavity that is in fluid communication with the conduit 626 of the neck portion 620. As illustrated in FIG. 9A, the first end 632 of the torch head portion 630 may have a larger diameter than the second end 624 of the neck portion 620, such that the first end 632 of the torch head portion 630 defines a flange 636. In some embodiments, the neck portion 620 may have an outer diameter of approximately 1 and ⅛ inches.

Figure 9B:
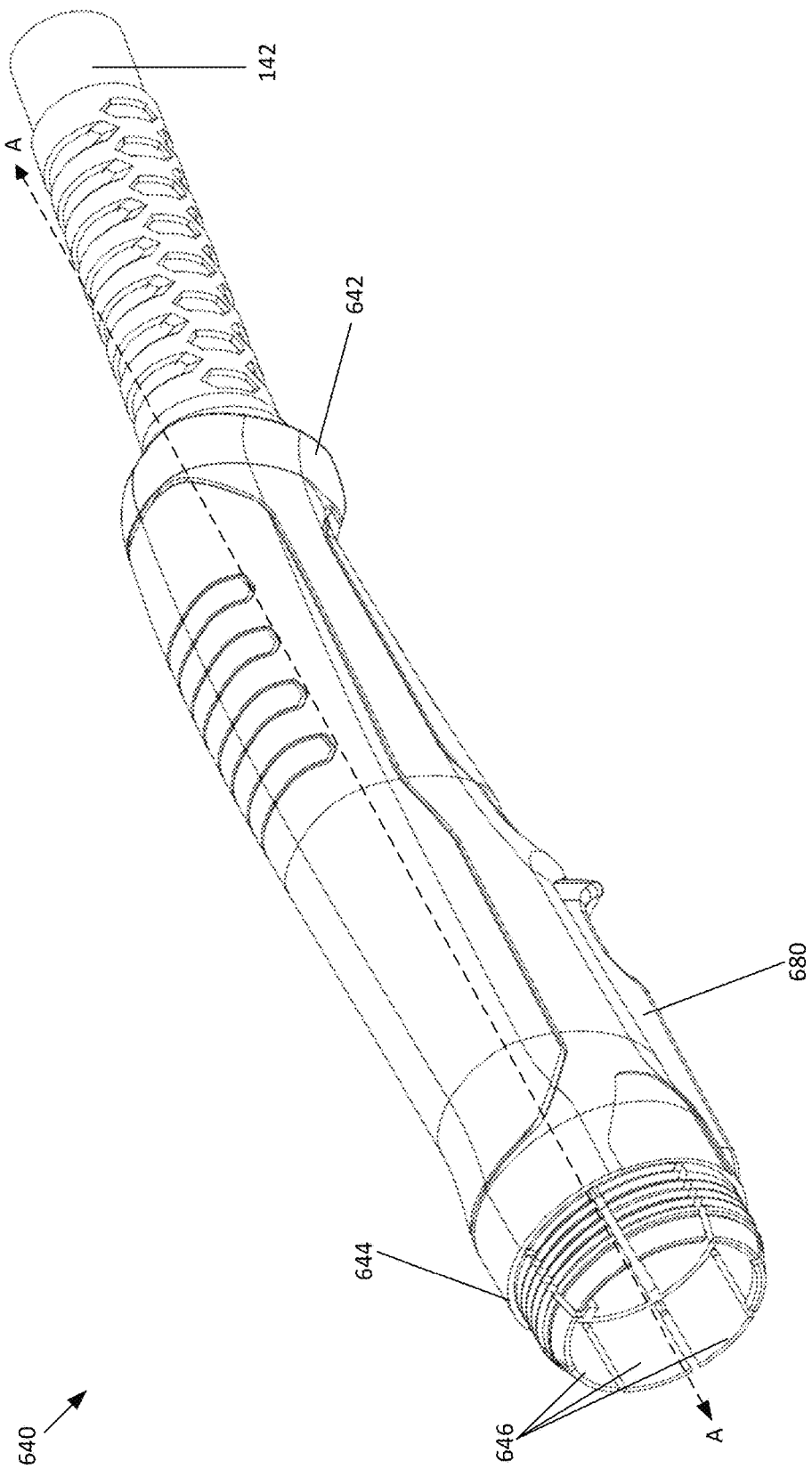
FIG. 9B is a side view of the torch housing portion of the third example embodiment of the torch illustrated in FIG. 8A.
Figure 9C:
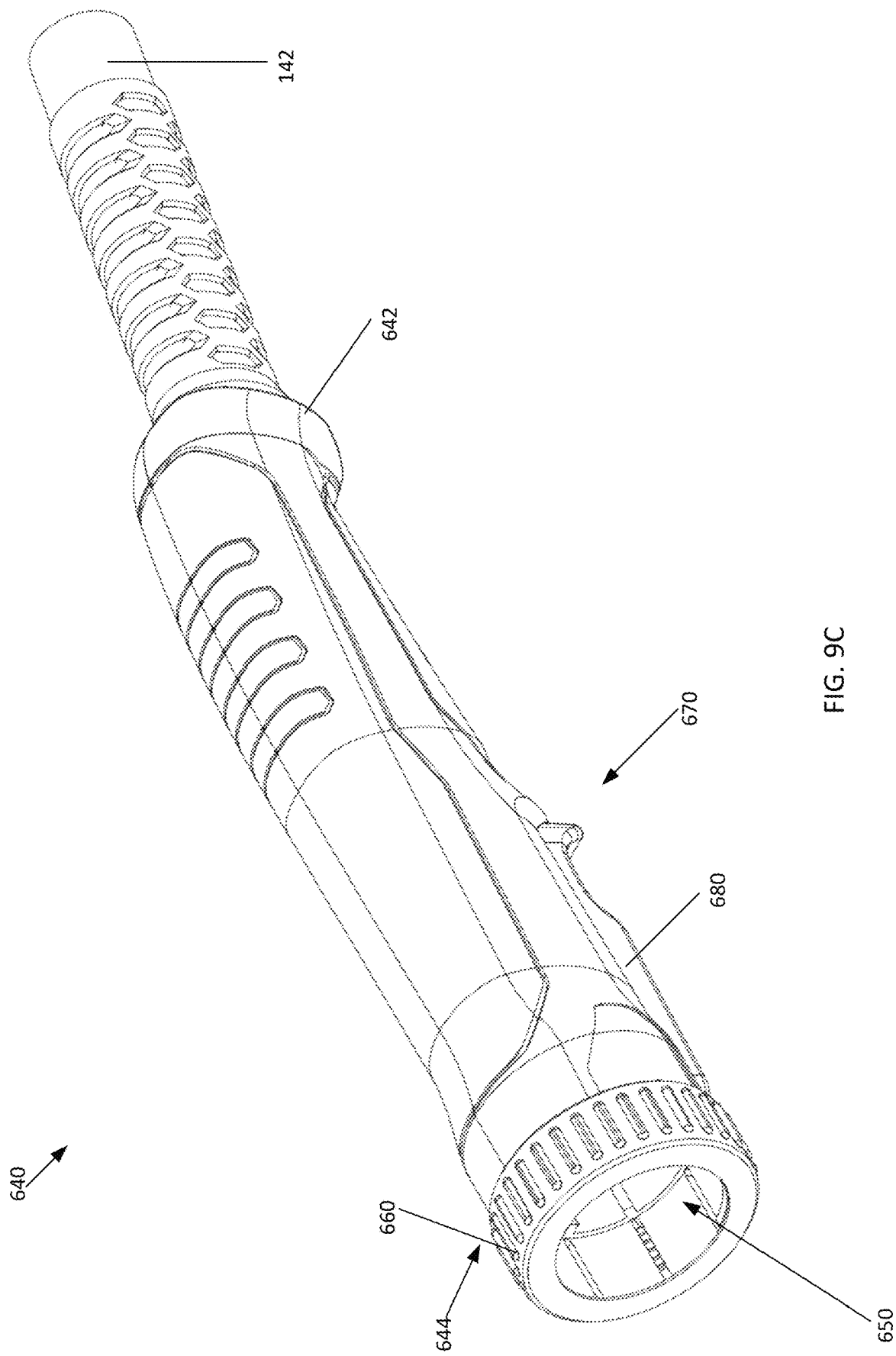
FIG. 9C is a perspective view of the torch housing portion with the collar of the third example embodiment of the torch illustrated in FIG. 8A.

With reference to FIGS. 9B and 9C, the torch body housing 640 may be an elongated body that also includes a first end 642 and an opposite second end 644. As best illustrated in FIG. 9B, the second end 644 of the torch body housing 640 may include a series of annular tabs 646 that are configured to be hingedly coupled to the second end 644 of the torch body housing 640. More specifically, the annular tabs 646 may be coupled to the second end 644 of the torch body housing 640 such that the annular tabs 646 operate as living hinges with respect to the torch body housing 640. As further illustrated, the torch body housing 640 may define an interior cavity 650 that, as further detailed below, is configured to slidably receive the neck portion 620 of the torch head housing 610 via an opening in the second end 644 of the torch body housing 640. The torch body housing 640 may further include a collet or lock ring 660 that is threaded onto/around the annular tabs 646 of the second end 644 of the torch body housing 640. When the lock ring 660 is rotated about the central axis A in a first direction, the lock ring 660 is tightened onto the annular tabs 646, which causes the annular tabs 646 to converge axially toward one another (i.e., the annular tabs 646 bend toward the central axis A via their living hinge connection to the second end 644 of the torch body housing 640). When the lock ring 660 is rotated about the central axis A in a second direction, which is opposite the first direction, the lock ring 660 is loosened from the annular tabs 646, which enables the annular tabs 646 to diverge from one another (i.e., the annular tabs 646 bend outwardly from the central axis A via their living hinge connection to the second end 644 of the torch body housing 640).

With further reference to FIG. 9C, the torch body housing 640 may further contain an elongated opening 670 in the sidewall of the torch body housing 640. The elongated opening 670 may provide access to the interior cavity 650 of the torch body housing 640. As best illustrated in FIGS. 9B, 9C, 10A, and 10B, the trigger 680 of the torch body housing 640 may be movably disposed within the elongated opening 670 such that the trigger 680 extends through the elongated opening 670.

Figure 8A:
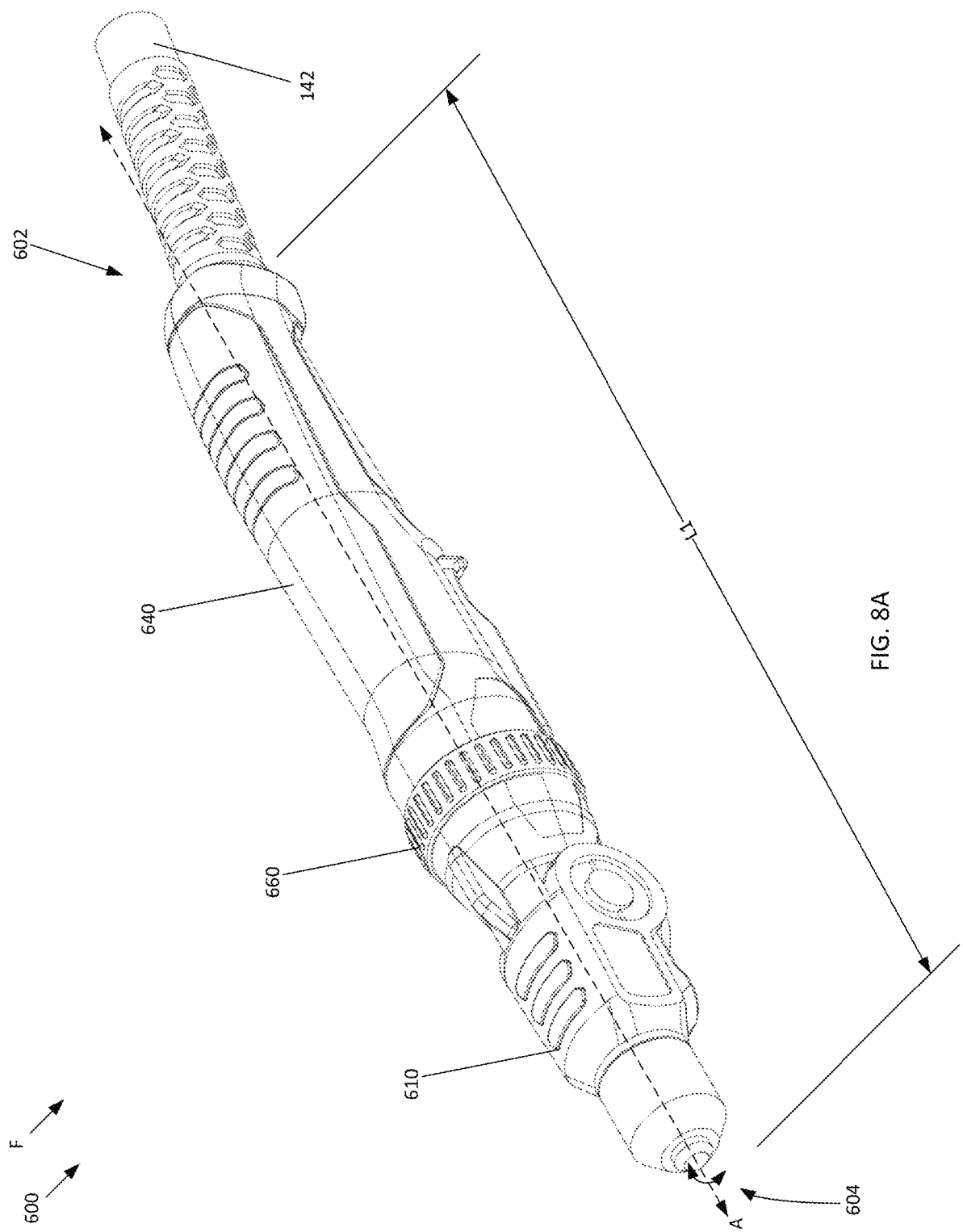
FIG. 8A is a perspective view of a third example embodiment of a torch according to the present disclosure, where the torch is in the fully collapsed configuration.
Figure 8B:
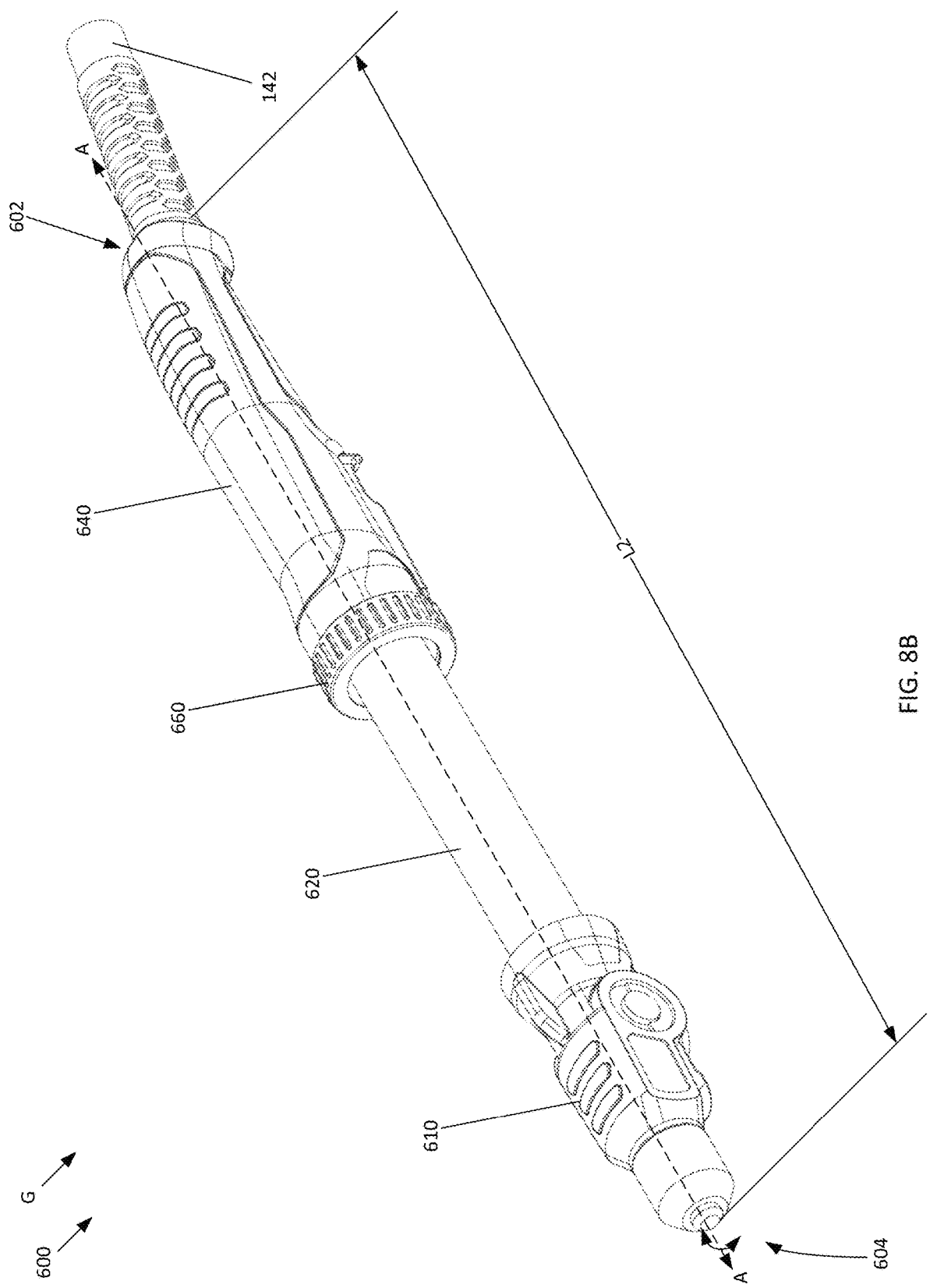
FIG. 8B is a perspective view of the third example embodiment of the torch illustrated in FIG. 8A, where the torch is in the fully expanded configuration.
Figure 10A:
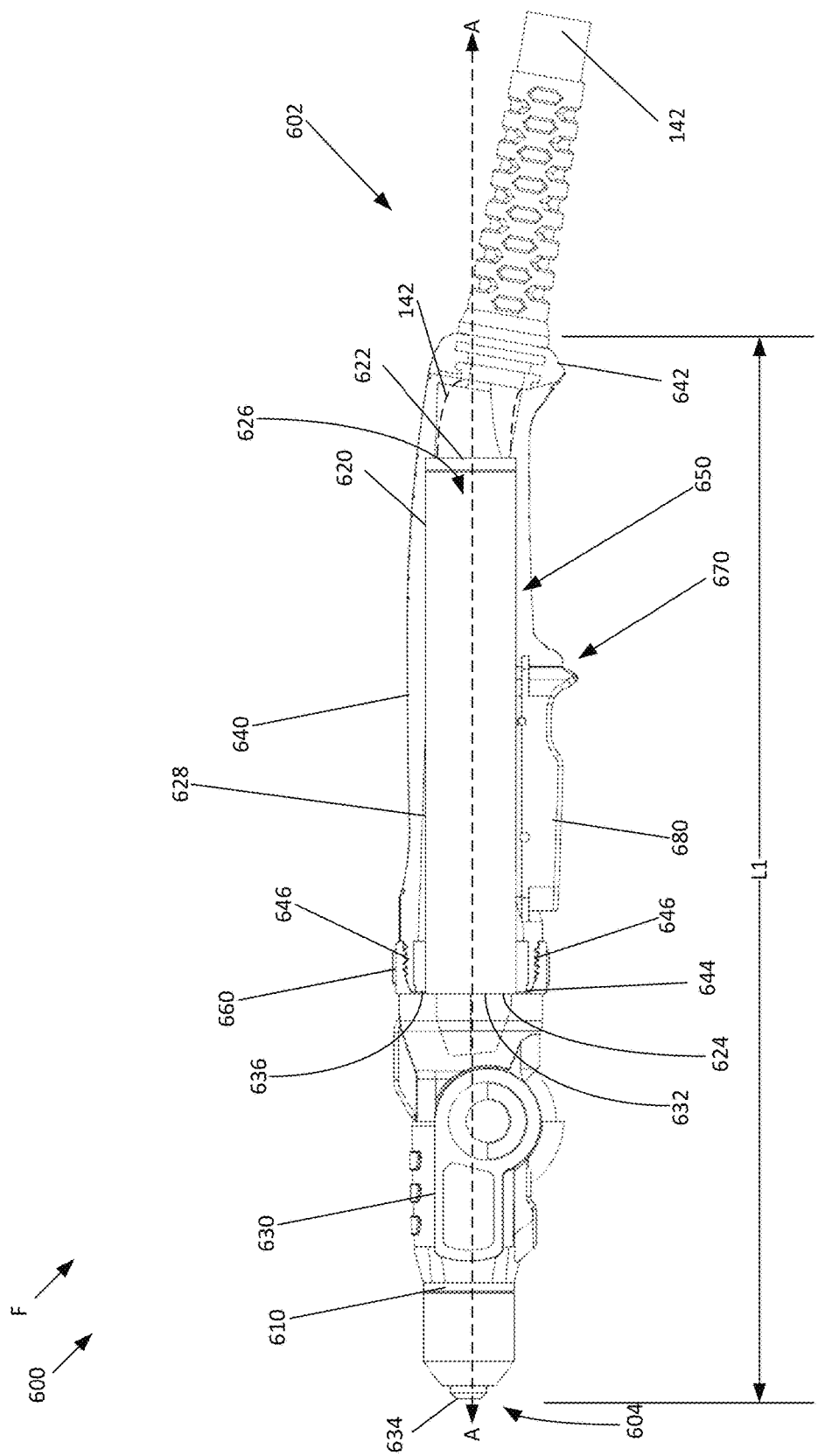
FIG. 10A is a cross-sectional view of the third example embodiment of the torch illustrated in FIG. 8A, where the torch is in the fully collapsed configuration.
Figure 10B:
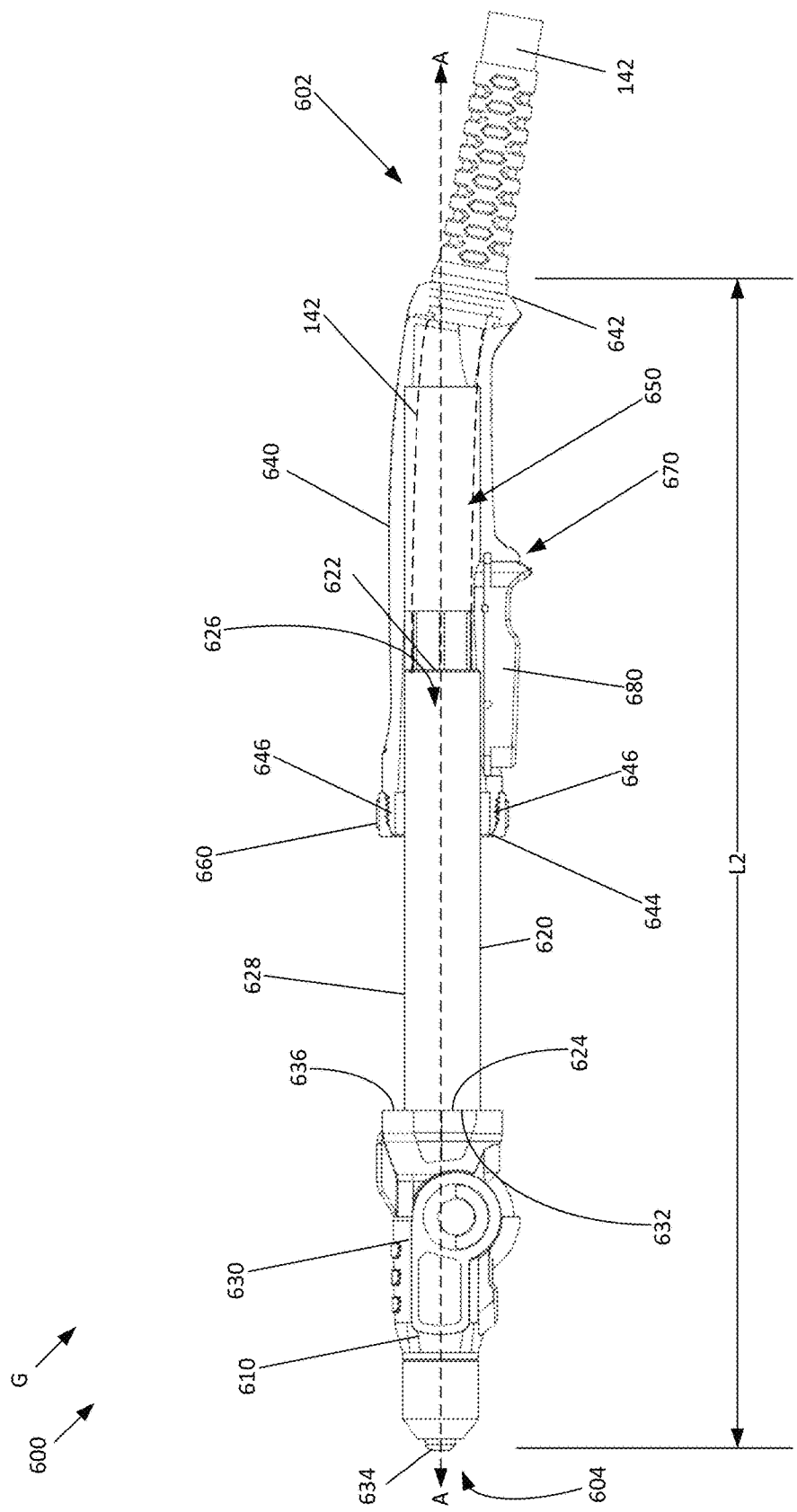
FIG. 10B is a cross-sectional view of the third example embodiment of the torch illustrated in FIG. 8A, where the torch is in the fully expanded configuration.

As previously stated, the torch head housing 610 may be configured to telescope, or axially extend/contract, with respect to the torch body housing 640 in order to change/alter the length of the torch 600. As best illustrated in FIGS. 10A and 10B, the neck portion 620 may be slidably disposed within the interior cavity 650 of the torch body housing 640 by being inserted through the annular tabs 646 (e.g., such that the annular tabs 646 at least partially surround the neck portion 620) and the second end 644 of the torch body housing 640. More specifically, at least the first end 622 of the neck portion 620 is disposed within the interior cavity 650. When the torch 600 is in the fully collapsed configuration F, which is illustrated in FIGS. 8A and 10A, the first end 622 of the neck portion 620 of the torch head housing 610 is disposed within the interior cavity 650 more proximate to the first end 642 of the torch body housing 640 than the second end 644 of the torch body housing 640. Furthermore, the flange 636 of the torch head portion 630 of the torch head housing 610 may be disposed against, or proximate to, the lock ring 660 and the annular tabs 646 of the second end 644 of the torch body housing 640. The abutment of the flange 636 of the torch head portion 630 of the torch head housing 610 against the lock ring 660 prevents the torch head housing 610 from sliding even further into the interior cavity 650 of the torch body housing 640. When the torch 600 is in the fully expanded configuration G, which is illustrated in FIGS. 8B and 10B, the first end 622 of the neck portion 620 of the torch head housing 610 may be disposed more proximate to the second end 644 of the torch body housing 640 than the first end 642 of the torch body housing 640. In this fully expanded configuration G, or any configuration between the fully expanded configuration G and the fully collapsed position F, at least a portion of the neck portion 620 may be exposed (i.e., due to the spacing between the flange 636 and the lock ring 660 in these positions). Moreover, the third embodiment of the torch 600 may be reconfigured to an infinite number of configurations between the fully collapsed position F and the fully expanded configuration G.

With continued reference to FIGS. 10A and 10B, the torch lead or cable hose 142 may be directly coupled to the first end 622 of the neck portion 620 within the interior cavity 650 of the torch body housing 640 such that the torch lead 142 extends out of the first end 642 of the torch body housing 640. With the torch lead 142 coupled to the first end 622 of the neck portion 620, as the third embodiment of the torch 600 is expanded in length from the fully collapsed configuration F, the torch body housing 640 slides along a portion of the torch lead 142. Furthermore, the distance between the connection of the torch lead 142 to the torch 600 and the second end 614 of the torch head housing 610 remains the same regardless of the length configuration in which the torch 600 placed. Thus, as the torch 600 is expanded from the fully collapsed configuration F to the fully expanded configuration G, portions of the torch lead 142 are pulled into the interior cavity 650 of the torch body housing 640 (i.e., a larger portion of the torch lead 142 is disposed within the interior cavity 650 in the fully expanded configuration G than the fully collapsed configuration F).

Once the third embodiment of the torch 600 is at the desired length, a user of the torch 600 may rotate the lock ring 660 in a first direction to tighten the annular tabs 646 (i.e., apply pressure or impart a clamping force) onto the exterior surface 628 of the neck portion 620 to lock or secure the position of the torch head housing 610 with respect to the torch body housing 640. When the user desires to reconfigure the length of the torch 600, the user may rotate the lock ring 660 in the second direction to reduce the amount of pressure (i.e., reduce the clamping force) the annular tabs 646 apply to the exterior surface 628 of the neck portion 620 of the torch head housing 610. In some instances, it may be possible for the user to tighten the lock ring 660 such that enough pressure is applied to the exterior surface 628 of the neck portion 620 of the torch head housing 610 by the annular tabs 646 that the torch head housing 610 is secured with respect to the torch body housing 640 during normal operations (e.g., plasma cutting) of the torch 600, but that still enables a user to manually adjust the positioning of the torch head housing 610 with respect to the torch body housing 640. For example, the user may be able to apply enough of a pull force, push force, or rotational force to overcome the pressure or clamping forced applied to the neck portion 620 of the torch head housing 610 by the annular tabs 646 of the torch body housing 640 in order to adjust the positioning of the torch head housing 610 with respect to the torch body housing 640. In other instances, the user may be able to tighten the lock ring 660 enough to fully lock the position of the torch head housing 610 with respect to the torch body housing 640 (i.e., place the torch 600 in a fully "rigid" orientation) such that the torch head housing 610 and the torch body housing 640 may not be subjected to any manual reconfigurations without loosening the lock ring 660.

For embodiments where the neck portion 620 of the torch head housing 610 and the interior cavity 650 of the torch body housing 640 are cylindrical (i.e., have a circular cross-section), the torch head housing 610 may be configured to axially rotate with respect to the torch body housing 640, or vice versa. This may enable the user to position the trigger in a desired position with respect to the consumable attached to the torch head housing 610.

While the torches presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the torches presented herein may be modified to connect to, or be used with, any desired consumable or non-consumable components, as well as any desired torch lead or cable hose. Additionally, the torches presented herein may be suitable for any type of welding and/or cutting operations, including automated (e.g., mechanized) and/or manual (e.g., handheld) operations.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer," and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the torches described herein, or portions thereof may be fabricated from any suitable material or combination of materials, such as plastic or metals, as well as derivatives thereof, and combinations thereof.

Finally, when used herein, the term "comprises" and its derivations (such as "comprising," etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about," "around," "generally," and "substantially."

What is claimed is:

1. A plasma arc torch, comprising:
    a first torch housing portion;
    a second torch housing portion slidably coupled to the first torch housing portion, wherein the second torch housing portion is configured to slide along a longitudinal direction of the plasma arc torch to adjust a length of the plasma arc torch, the second torch housing portion being slidable between a first position in which the second torch housing portion and the first torch housing portion span a first length and a second position in which the second torch housing portion longitudinally extends from the first torch housing portion so that the second torch housing portion and the first torch housing portion span a second length greater than the first length;
    an electrical connection for plasma cutting power comprising a first tube fixed to the second torch housing portion and a second tube disposed within the first torch housing portion, the first tube and the second tube being nested within one another and being configured to slide along one another such that the first tube extends further beyond the second tube when the second torch housing portion is in the second position than when the second torch housing portion is in the first position, so that the electrical connection is configured to slidably extend or slidably collapse as the second torch housing portion moves between the first position and the second position to deliver the plasma cutting power regardless of the length of the plasma arc torch; and
    a pilot electrical connection configured to provide a pilot connection regardless of the length of the plasma arc torch, the pilot electrical connection being provided separately from the first tube and the second tube.

2. The plasma arc torch according to claim 1, wherein the second torch housing portion includes a torch head segment and a neck segment.

3. The plasma arc torch according to claim 2, wherein the neck segment includes an exterior surface.

4. The plasma arc torch according to claim 3, wherein the exterior surface of the neck segment includes a series of notches longitudinally spaced from one another.

5. The plasma arc torch according to claim 4, wherein the first torch housing portion includes a length adjustment mechanism configured to operatively engage one of the series of notches of the neck segment to secure the second torch housing portion with respect to the first torch housing portion.

6. The plasma arc torch according to claim 3, wherein the exterior surface of the neck segment includes a tab, and wherein the first torch housing portion comprises:
    a conduit configured to slidably receive the neck segment of the second torch housing portion; and
    a longitudinal slot disposed in an interior sidewall of the conduit, the longitudinal slot configured to receive the tab of the neck segment of the second torch housing portion.

7. The plasma arc torch according to claim 3, wherein an end of the first torch housing portion includes a series of annular tabs.

8. The plasma arc torch according to claim 7, wherein a lock ring is threaded onto the series of annular tabs and configured to cause the series of annular tabs to impart a clamping force onto the exterior surface of the neck segment based on rotation of the lock ring with respect to the series of annular tabs.

9. The plasma arc torch according to claim 1, wherein:
    the second tube includes a first end and a second end opposite the first end, wherein the first tube and the second tube are nested within one another such that the first end of the second tube is disposed within an interior cavity of the first torch housing portion.

10. The plasma arc torch according to claim 9, wherein the second tube further comprises a gasket disposed over an exterior surface of the second tube proximate to the first end of the second tube.

11. The plasma arc torch according to claim 9, the second tube further comprises a conductive contact coupled to an exterior surface of the second tube proximate to the first end of the second tube.

12. The plasma arc torch according to claim 9, wherein the second end of the second tube is coupled to a gas supply line.

13. The plasma arc torch according to claim 1, wherein the first torch housing portion further comprises:
a conduit disposed in a first end of the first torch housing portion and in communication with an interior cavity of the first torch housing portion.

14. The plasma arc torch according to claim 13, wherein the second torch housing portion includes a torch head portion and a neck portion, the neck portion being at least partially received by the conduit of the first torch housing portion.

15. The plasma arc torch according to claim 1, wherein the pilot electrical connection comprises:
a first electrical contact disposed within an interior cavity of the first torch housing portion, and
a second electrical contact extending from the second torch housing portion and in contact with the first electrical contact, wherein the second electrical contact slides along the first electrical contact when the second torch housing portion slides between the first position and the second position along the longitudinal direction with respect to the first torch housing portion.

16. The plasma arc torch according to claim 15, wherein the first torch housing portion further comprises:
a conduit disposed in a first end of the first torch housing portion and in communication with the interior cavity of the first torch housing portion; and,
wherein the second torch housing portion comprises:
a torch head portion, and
a neck portion, wherein the neck portion includes a distal end coupled to the torch head portion and a proximal end opposite the distal end, and wherein the neck portion is at least partially received by the conduit of the first torch housing portion such that the proximal end is disposed within the conduit.

17. The plasma arc torch according to claim 16, wherein:
the first electrical contact includes a conductive portion that spans along at least a length of the conduit within the interior cavity of the first torch housing portion; and
the second electrical contact extends from the neck portion of the second torch housing portion proximate to the proximal end of the neck portion.

18. A plasma arc torch, comprising:
a first torch housing portion including a handle;
a second torch housing portion including a torch head portion on which consumables are installed and a neck portion that is at least partially received by a conduit of the first torch housing portion, the second torch housing portion being slidably coupled to the first torch housing portion so that second torch housing portion is configured to slide along a longitudinal direction of the plasma arc torch to adjust a length of the plasma arc torch, the second torch housing portion being slidable between a first position in which the torch head portion of the second torch housing portion is proximate the first torch housing portion and a second position in which the torch head portion is longitudinally separated from the first torch housing portion; and
an electrical connection for plasma cutting power comprising a first tube fixed to the second torch housing portion and a second tube disposed within the first torch housing portion, the first tube and the second tube being nested within one another and being configured to slide along one another such that the first tube extends further beyond the second tube when the second torch housing portion is in the second position than when the second torch housing portion is in the first position so that the electrical connection is configured to slidably extend or slidably collapse as the second torch housing portion moves between the first position and the second position to deliver plasma cutting power regardless of the length of the plasma arc torch.

19. The plasma arc torch according to claim 18, wherein the first torch housing portion includes a length adjustment mechanism configured to operatively engage one of a series of notches included on the neck portion to secure the second torch housing portion with respect to the first torch housing portion.

* * * * *